United States Patent
Ornella et al.

(10) Patent No.: US 10,377,220 B2
(45) Date of Patent: Aug. 13, 2019

(54) DUAL MODE HYBRID HYDROSTATIC DRIVELINE

(71) Applicant: DANA ITALIA SPA, Arco (IT)

(72) Inventors: Giulio Ornella, Arco (IT); Lorenzo Serrao, Nago-Torbole (IT)

(73) Assignee: Dana Italia SPA, Arco (IT)

( * ) Notice: Subject to any disclaimer, the term of this patent is extended or adjusted under 35 U.S.C. 154(b) by 322 days.

(21) Appl. No.: 15/121,659

(22) PCT Filed: Feb. 27, 2015

(86) PCT No.: PCT/EP2015/054132
§ 371 (c)(1),
(2) Date: Aug. 25, 2016

(87) PCT Pub. No.: WO2015/128462
PCT Pub. Date: Sep. 3, 2015

(65) Prior Publication Data
US 2016/0361986 A1 Dec. 15, 2016

(30) Foreign Application Priority Data
Feb. 28, 2014 (EP) ..................................... 14157268

(51) Int. Cl.
*B60K 6/12* (2006.01)
*B60K 6/442* (2007.10)
(Continued)

(52) U.S. Cl.
CPC ............... *B60K 6/12* (2013.01); *B60K 6/442* (2013.01); *B60K 17/02* (2013.01); *B60K 17/10* (2013.01);
(Continued)

(58) Field of Classification Search
CPC .......... B60K 6/12; B60K 6/442; B60K 17/02; B60K 17/10
(Continued)

(56) References Cited

U.S. PATENT DOCUMENTS 5,088,041 A * 2/1992 Tanaka ..................... B60K 6/12
180/165
6,971,463 B2 12/2005 Shore et al.
(Continued)

FOREIGN PATENT DOCUMENTS

EP 2471679 A2 7/2012
EP 2666657 A1 11/2013
(Continued)

OTHER PUBLICATIONS

European Patent Office, The International Search Report with Written Opinion, dated Jul. 6, 2015, 9 pages, European Patent Office, Rijswijk, Netherlands.
(Continued)

*Primary Examiner* — Ha Dinh Ho
(74) *Attorney, Agent, or Firm* — Marshall & Melhorn, LLC

(57) ABSTRACT

A hybrid driveline which may be operated in a hydrostatic drive mode and a direct drive mode and a method of operating a hybrid driveline in a hydrostatic drive mode and a direct drive mode is provided. The hybrid driveline comprises a power source, a first hydrostatic unit drivingly engaged with the power source, a second hydrostatic unit selectively drivingly engaged with a vehicle output and in fluid communication with the first hydrostatic unit, an accumulator assembly in fluid communication with the first hydrostatic unit and the second hydrostatic unit, and a clutching device selectively drivingly engaged with the vehicle output and one of the first hydrostatic unit and the
(Continued)

second hydrostatic unit. The hybrid driveline provides the benefits of a series hybrid arrangement and a parallel hybrid arrangement, reduces torque interruptions during operation and shifting procedures, and increases an efficiency of a vehicle the driveline is incorporated in.

12 Claims, 5 Drawing Sheets

(51) Int. Cl.
    *B60K 17/10*     (2006.01)
    *B60W 10/02*     (2006.01)
    *B60K 17/02*     (2006.01)

(52) U.S. Cl.
    CPC .......... *B60W 10/02* (2013.01); *Y02T 10/6208* (2013.01); *Y02T 10/6234* (2013.01); *Y02T 10/6282* (2013.01)

(58) Field of Classification Search
    USPC .............................................. 74/720.1, 730.1
    See application file for complete search history.

(56) References Cited

U.S. PATENT DOCUMENTS

| | | |
|---|---|---|
| 7,082,757 B2 | 8/2006 | Teslak et al. |
| 7,107,767 B2 | 9/2006 | Frazer et al. |
| 7,669,414 B2* | 3/2010 | Loeffler ................ B60K 6/12 60/414 |
| 7,673,451 B2 | 3/2010 | Anderson et al. |
| 7,779,628 B2 | 8/2010 | Petre |
| 7,913,791 B2 | 3/2011 | Rose et al. |
| 8,079,437 B2 | 12/2011 | Rosman |
| 8,099,198 B2 | 1/2012 | Gurin |
| 8,151,563 B2 | 4/2012 | Schneider et al. |
| 8,342,995 B2 | 1/2013 | Grant |
| 8,387,731 B2 | 3/2013 | Rink |
| 8,567,544 B2 | 10/2013 | Rosman |
| 8,622,859 B2 | 1/2014 | Babbitt et al. |
| 8,771,138 B2 | 7/2014 | Van Batavia et al. |
| 8,978,375 B2 | 3/2015 | Prigent et al. |
| 9,193,251 B2 | 11/2015 | Gauthier |
| 9,199,647 B2 | 12/2015 | Zhang |
| 9,352,742 B2 | 5/2016 | Gauthier |
| 2004/0050042 A1 | 3/2004 | Frazer |
| 2006/0000207 A1 | 1/2006 | Rush |
| 2009/0076690 A1 | 3/2009 | Guo et al. |
| 2009/0127011 A1* | 5/2009 | Zhang ................ B60K 6/12 180/65.28 |
| 2009/0173066 A1* | 7/2009 | Duray ................ B60K 6/12 60/413 |
| 2009/0270221 A1* | 10/2009 | Kovach ................ B60K 6/12 477/3 |
| 2011/0180287 A1 | 7/2011 | Stenzel |
| 2012/0240564 A1 | 9/2012 | Wesolowski et al. |
| 2013/0316874 A1 | 11/2013 | Lucienne et al. |

FOREIGN PATENT DOCUMENTS

| | | |
|---|---|---|
| FR | 2970908 A1 | 8/2012 |
| JP | 11030305 A | 2/1999 |
| WO | 2008/133805 A2 | 11/2008 |
| WO | 2011/045519 A1 | 4/2011 |
| WO | 2012/031970 A1 | 3/2012 |
| WO | 2012/035237 A2 | 3/2012 |

OTHER PUBLICATIONS

European Patent Office, The Extended European Search Report, dated Sep. 14, 2016, 5 pages, European Patent Office, Munich, Germany.

* cited by examiner

DUAL MODE HYBRID HYDROSTATIC DRIVELINE

FIELD OF THE INVENTION

The present invention generally relates to power transmission systems. More particularly, this invention relates to a hybrid hydrostatic transmission for a vehicle, in which the hybrid hydrostatic transmission may be operated in a hydrostatic power transmission mode or a direct drive power transmission mode.

BACKGROUND OF THE INVENTION

Vehicles that incorporate hybrid hydrostatic transmissions, such as earth moving machinery, industrial equipment, and others are typically referred to as having a series hybrid arrangement or a parallel hybrid arrangement. In the series hybrid arrangement, at least one accumulator and a control valve are used to collect energy from or deliver stored energy to a conventional hydrostatic transmission, which includes a first hydrostatic unit drivingly engaged with a power source and a second hydrostatic unit drivingly engaged with a transmission output. In the parallel hybrid arrangement, at least one accumulator and a control valve are used to collect energy from or deliver stored energy to a hydrostatic unit, which is drivingly engaged with both a power source and a transmission output.

Vehicles which include such hybrid hydrostatic transmissions are typically operated in a working cycle mode and a transport cycle mode. In the working cycle mode, the vehicle typically operates at lower speeds and with a variable gear ratio. Torque interruptions within the hybrid hydrostatic transmissions are strongly disfavored in the working cycle mode. The working cycle mode is typically employed in lifting operations and pushing operations. In the transport cycle mode, the vehicle typically operates at higher speeds and with one or more fixed gear ratios. The transport cycle mode is typically employed in hauling operations or while moving the vehicle between areas the working cycle mode is used in. Increased efficiency of the hybrid hydrostatic transmissions is strongly desired in both the working cycle mode and the transport cycle mode.

Vehicles which include such hybrid hydrostatic transmissions are also subject to torque interruptions during a shifting procedure between the working cycle mode and the transport cycle mode. Such torque interruptions may result in reduced performance of the vehicle and operator dissatisfaction.

It would be advantageous to develop a hybrid hydrostatic driveline and a method of operation thereof for a vehicle that provides the benefits of a series hybrid arrangement and a parallel hybrid arrangement, reduces torque interruptions during operation and shifting procedures, and increases an efficiency of a vehicle the hybrid hydrostatic driveline is incorporated in.

SUMMARY OF THE INVENTION

Presently provided by the invention, a hybrid hydrostatic driveline and a method for shifting a powersplit transmission between modes of operation that minimizes torque interruption, increases a fuel efficiency of a vehicle, and increases a range of operating speeds of the vehicle the powersplit transmission is incorporated in, has surprisingly been discovered.

In one embodiment, the present invention is directed to a hybrid driveline for a vehicle which may be operated in a hydrostatic drive mode and a direct drive mode. The hybrid driveline comprises a power source, a first hydrostatic unit drivingly engaged with the power source, a second hydrostatic unit selectively drivingly engaged with a vehicle output and in fluid communication with the first hydrostatic unit, an accumulator assembly in fluid communication with the first hydrostatic unit and the second hydrostatic unit, and a clutching device selectively drivingly engaged with the vehicle output and one of the first hydrostatic unit and the second hydrostatic unit. The hybrid driveline is operated in the hydrostatic drive mode by drivingly engaging the second hydrostatic unit with the vehicle output using the clutching device. The hybrid driveline is operated in the direct drive mode by drivingly engaging the power source with the vehicle output using the clutching device.

In another embodiment, the present invention is directed to a method of operating a hybrid driveline for a vehicle in a hydrostatic drive mode and a direct drive mode. The method comprises the steps of providing a power source, providing a first hydrostatic unit drivingly engaged with the power source, providing a second hydrostatic unit selectively drivingly engaged with a vehicle output and in fluid communication with the first hydrostatic unit, providing an accumulator assembly in fluid communication with the first hydrostatic unit and the second hydrostatic unit, providing a clutching device selectively drivingly engaged with the vehicle output and one of the first hydrostatic unit and the second hydrostatic unit, drivingly engaging the second hydrostatic unit with the vehicle output using the clutching device to place the hybrid driveline in the hydrostatic drive mode, and drivingly engaging the power source with the vehicle output using the clutching device to place the hybrid driveline in the direct drive mode.

Embodiments are related, inter alia, to the following examples:

1. A hybrid driveline for a vehicle which may be operated in a hydrostatic drive mode and a direct drive mode, the hybrid driveline comprising:
   a power source;
   a first hydrostatic unit drivingly engaged with the power source;
   a second hydrostatic unit selectively drivingly engaged with a vehicle output, the second hydrostatic unit in fluid communication with the first hydrostatic unit;
   an accumulator assembly in fluid communication with the first hydrostatic unit and the second hydrostatic unit; and
   a clutching device selectively drivingly engaged with the vehicle output and one of the first hydrostatic unit and the second hydrostatic unit;
   a first fluid conduit fluidly connecting a first fluid port of the first hydrostatic unit to a first fluid port of the second hydrostatic unit;
   a second fluid conduit fluidly connecting a second fluid port of the first hydrostatic unit to a second fluid port of the second hydrostatic unit;
   a low range gear; and
   a high range gear;
   wherein the hybrid driveline is operated in the hydrostatic drive mode by drivingly engaging the second hydrostatic unit with the vehicle output through the low range gear using the clutching device and by transferring power from the power source to the vehicle output via the first hydrostatic unit, the fluid conduits, the second hydrostatic unit and the clutching device; and wherein the hybrid driveline is operated in the direct drive mode by drivingly engaging the power source with the vehicle output through the high range gear using the clutching device.

2. The hybrid driveline according to example 1, wherein the accumulator assembly comprises a low pressure accumulator, a high pressure accumulator, and at least one control valve.

3. The hybrid driveline according to example 2, wherein the at least one control valve has at least a first position and a second position, the at least one control valve in the first position facilitating fluid communication between the high pressure accumulator and the first fluid conduit in fluid communication with the first hydrostatic unit and the at least one control valve in the second position facilitating fluid communication between the high pressure accumulator and the second fluid conduit in fluid communication with the first hydrostatic unit and the second hydrostatic unit.

4. The hybrid driveline according to example 1, wherein the clutching device comprises a shift collar, a first synchronizer, and a second synchronizer.

5. The hybrid driveline according to example 1, wherein the clutching device comprises a shift collar, a first synchronizer, and a second synchronizer; the first synchronizer facilitating synchronization engagement between the first hydrostatic unit and the vehicle output and the second synchronizer facilitating synchronization between the second hydrostatic unit and the vehicle output.

6. The hybrid driveline according to example 1, wherein the clutching device comprises a first clutch and a second clutch; the first clutch facilitating variable driving engagement between the first hydrostatic unit and the vehicle output and the second clutch facilitating variable driving engagement between the second hydrostatic unit and the vehicle output.

7. The hybrid driveline according to example 6, wherein the first clutch and the second clutch are each wet plate style clutches.

8. The hybrid driveline according to example 1, further comprising a third hydrostatic unit which may be selectively drivingly engaged with a vehicle output, the third hydrostatic unit in fluid communication with the first hydrostatic unit and the accumulator assembly.

9. The hybrid driveline according to example 8, wherein the clutching device comprises a first clutch, a second clutch, and a third clutch; the first clutch facilitating variable driving engagement between the first hydrostatic unit and the vehicle output, the second clutch facilitating variable driving engagement between the second hydrostatic unit and the vehicle output, and the third clutch facilitating variable driving engagement between the third hydrostatic unit and the vehicle output.

10 The hybrid driveline according to example 9, wherein the first clutch, the second clutch, and the third clutch are each wet plate style clutches.

11. A method of operating a hybrid driveline for a vehicle in a hydrostatic drive mode and a direct drive mode, the method comprising the steps of:

providing a power source;

providing a first hydrostatic unit drivingly engaged with the power source;

providing a second hydrostatic unit selectively drivingly engaged with a vehicle output, the second hydrostatic unit in fluid communication with the first hydrostatic unit;

providing an accumulator assembly in fluid communication with the first hydrostatic unit and the second hydrostatic unit;

providing a clutching device selectively drivingly engaged with the vehicle output and one of the first hydrostatic unit and the second hydrostatic unit;

providing a first fluid conduit fluidly connecting a first fluid port of the first hydrostatic unit to a first fluid port of the second hydrostatic unit;

providing a second fluid conduit fluidly connecting a second fluid port of the first hydrostatic unit to a second fluid port of the second hydrostatic unit;

providing a low range gear;

providing a high range gear;

drivingly engaging the second hydrostatic unit with the vehicle output through the low range gear using the clutching device and transferring power from the power source to the vehicle output via the first hydrostatic unit, the fluid conduits, the second hydrostatic unit and the clutching device to place the hybrid driveline in the hydrostatic drive mode; and drivingly engaging the power source with the vehicle output through the high range gear using the clutching device to place the hybrid driveline in the direct drive mode.

12. The method of operating a hybrid driveline for a vehicle in a hydrostatic drive mode and a direct drive mode according to example 11, wherein the accumulator assembly comprises a low pressure accumulator, a high pressure accumulator, and at least one control valve.

13. The method of operating a hybrid driveline for a vehicle in a hydrostatic drive mode and a direct drive mode according to example 12, further comprising the step of placing the at least one control valve in one of a first position and a second position, the at least one control valve in the first position facilitating fluid communication between the high pressure accumulator and the first fluid conduit in fluid communication with the first hydrostatic unit and the at least one control valve in the second position facilitating fluid communication between the high pressure accumulator and the second fluid conduit in fluid communication with the first hydrostatic unit and the second hydrostatic unit.

14. The method of operating a hybrid driveline for a vehicle in a hydrostatic drive mode and a direct drive mode according to example 13, further comprising the step of applying a rotational force to the vehicle output using one of the first hydrostatic unit and the second hydrostatic unit in fluid communication with the high pressure accumulator and/or further comprising the step of collecting energy from the vehicle output using one of the first hydrostatic unit and the second hydrostatic unit in fluid communication with the high pressure accumulator and storing the energy in the high pressure accumulator and/or further comprising the step of collecting energy from the power source using the first hydrostatic unit in fluid communication with the high pressure accumulator and storing the energy in the high pressure accumulator to facilitate shifting from the hydrostatic drive mode to the direct drive mode and/or further comprising the step of applying a rotational force to the second hydrostatic unit using with the high pressure accumulator to facilitate shifting from the direct drive mode to the hydrostatic drive mode.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
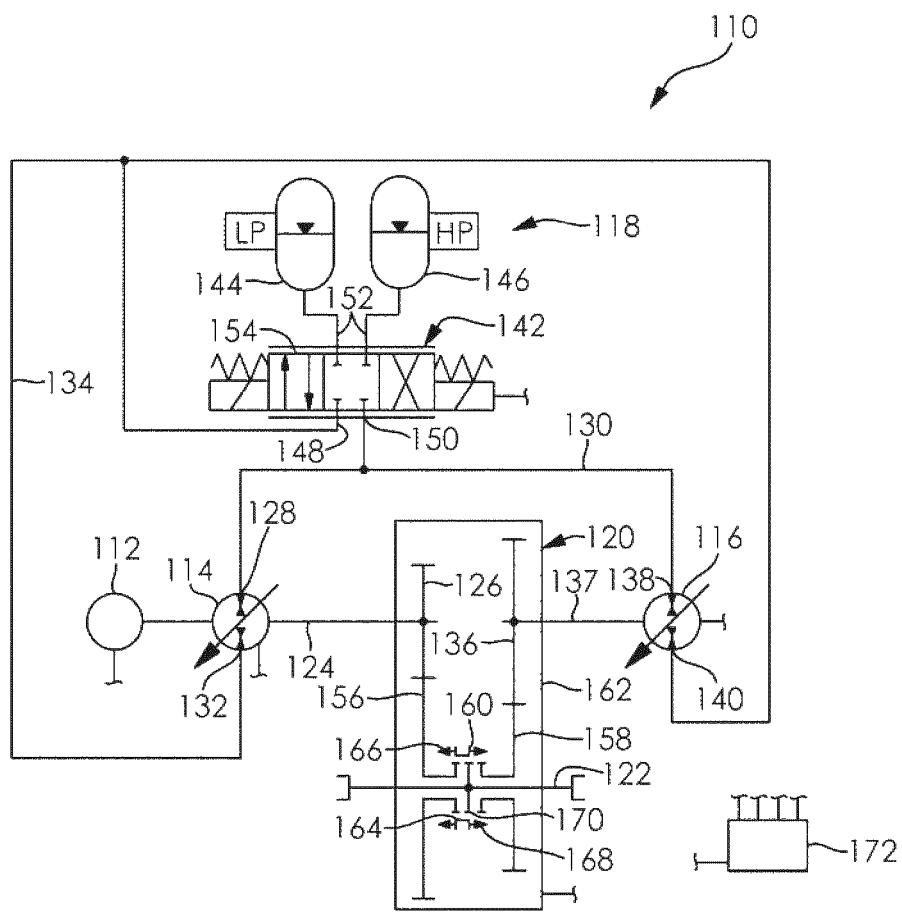
FIG. 1 is a schematic illustration of a hybrid driveline for a vehicle according to an embodiment of the invention.

FIG. 1 schematically illustrates a driveline 110 for a vehicle (not shown). The driveline 110 comprises a power source 112, a first hydrostatic unit 114, a second hydrostatic unit 116, an accumulator assembly 118, and a clutching device 120. The first hydrostatic unit 114 is drivingly engaged with the power source 112 and the clutching device 120. The second hydrostatic unit 116 is drivingly engaged with the clutching device 120. The accumulator assembly 118 is in fluid communication with the first hydrostatic unit 114 and the second hydrostatic unit 116. The clutching device 120 may be drivingly engaged with one of the power source 112 and the second hydrostatic unit 116 and an output 122. The driveline 110 is a hybrid driveline which may be operated in a hydrostatic mode and a direct drive mode.

The power source 112 applies power to an input 124 of the driveline 110, and thus the clutching device 120. The power source 112 is, for example, an internal combustion engine; however, it is understood that the power source 112 may include an electric motor or another source of rotational output. It is understood that the power source 112 may be a hybrid power source including both an internal combustion engine and an electric motor. Further, it is understood that the power source 112 may include an output ratio adjusting device as known in the art. Further, it is understood that the power source 112 may include a clutch (not shown) as known in the art, for one of reducing and interrupting a rotational force transferred to the driveline 110.

The input 124 comprises at least one rigid member which is drivingly engaged with the power source 112, the first hydrostatic unit 114, and a first input gear 126 of the clutching device 120. The input 124 may be a single elongate rigid member passing through the first hydrostatic unit 114; however, it is understood that the input 124 may comprise a plurality of rigid members drivingly engaged with one another.

The first hydrostatic unit 114 is a hydraulic axial piston pump having a movable swashplate (not shown) which varies a displacement thereof. However, it is understood the first hydrostatic unit 114 may be any other type of variable displacement pump. As mentioned hereinabove, the first hydrostatic unit 114 is drivingly engaged with the power source 112 through the input 124. A first fluid port 128 of the first hydrostatic unit 114 is in fluid communication with a first fluid conduit 130. A second fluid port 132 of the first hydrostatic unit 114 is in fluid communication with a second fluid conduit 134.

The second hydrostatic unit 116 is a hydraulic axial piston motor having a movable swashplate (not shown) which varies a displacement thereof. However, it is understood the second hydrostatic unit 116 may be any other type of hydrostatic motor. The second hydrostatic unit 116 is drivingly engaged with a second input gear 136 of the clutching device 120 through an input shaft 137. A first fluid port 138 of the second hydrostatic unit 116 is in fluid communication with the first fluid conduit 130. A second fluid port 140 of the second hydrostatic unit 116 is in fluid communication with the second fluid conduit 134.

The input shaft 137 comprises at least one rigid member which is drivingly engaged with the second hydrostatic unit 116, and the second input gear 136 of the clutching device 120. The input shaft 137 may be a single elongate rigid member; however, it is understood that the input shaft 137 may comprise a plurality of rigid members drivingly engaged with one another.

The first fluid conduit 130 and the second fluid conduit 134 are conduits used in hydraulic power systems as is known in the art. The first fluid conduit 130 and the second fluid conduit 134 may comprise flexible conduits, rigid conduits, or conduits formed within other components of the driveline 110. The first fluid conduit 130 is in fluid communication with the first hydrostatic unit 114 through the first fluid port 128 thereof, the second hydrostatic unit 116 through the first fluid port 138 thereof, and the accumulator assembly 118. The second fluid conduit 134 is in fluid communication with the first hydrostatic unit 114 through the second fluid port 132 thereof, the second hydrostatic unit 116 through the second fluid port 140 thereof, and the accumulator assembly 118.

The accumulator assembly 118 comprises a control valve 142, a low pressure accumulator 144, and a high pressure accumulator 146. The accumulator assembly 118 is in fluid communication with the first fluid conduit 130 and the second fluid conduit 134 via the control valve 142.

The control valve 142 is a three position, four way directional valve as is known in the art; however, it is understood the control valve 142 may be any other fluid control valve or a plurality of fluid control valves. The control valve 142 includes a first circuit port 148, a second circuit port 150, a pair of accumulator ports 152, and a sliding spool 154. The control valve 142 is in fluid communication with the first fluid conduit 130, the second fluid conduit 134, the low pressure accumulator 144, and the high pressure accumulator 146.

The low pressure accumulator 144 is an accumulator as is known in the art. The low pressure accumulator 144 is a hollow vessel in fluid communication with one of the accumulator ports 152 of the control valve 142. A quantity of gas within the low pressure accumulator 144 is compressed when hydraulic fluid enters the low pressure accumulator 144. The low pressure accumulator 144 is configured for operation within a particular pressure range. While not shown, the low pressure accumulator 144 may also be fitted with a flush valve (for draining the low pressure accumulator 144 to a fluid reservoir, not shown), a pressure relief valve (for draining the low pressure accumulator 144 to the fluid reservoir), a proportional valve (for cooperating with the control valve 144 for fluidly connecting the low pressure accumulator 144 to the one of the first fluid conduit 130 and the second fluid conduit 134), and a pilot valve (for providing fluid pressure to the control valve 142).

The high pressure accumulator 146 is an accumulator as is known in the art. The high pressure accumulator 146 is a hollow vessel in fluid communication with one of the accumulator ports 152 of the control valve 142. A quantity of gas within the high pressure accumulator 146 is compressed when hydraulic fluid enters the high pressure accumulator 146. The high pressure accumulator 146 is configured for operation within a particular pressure range. While not shown, the high pressure accumulator 146 may also be fitted with a flush valve (for draining the high pressure accumulator 146 to the fluid reservoir), a pressure relief valve (for draining the high pressure accumulator 146 to the fluid reservoir), a proportional valve (for cooperating with the control valve 142 for fluidly connecting the high pressure accumulator 146 to the one of the first fluid conduit 130 and the second fluid conduit 134), and a pilot valve (for providing fluid pressure to the control valve 142).

The clutching device 120 facilitates selective driving engagement in two different manners: between the input 124 and the output 122 and between the input shaft 137 and the output 122. Further, it is understood that the clutching device 120 may be placed in a neutral position, where neither the input 124 nor the input shaft 137 is drivingly engaged with the output 122. The clutching device 120 comprises the first input gear 126, the second input gear 136, a high range gear 156, a low range gear 158, a shift collar 160, and the output 122. The first input gear 126, the second input gear 136, the high range gear 156, the low range gear 158, the shift collar 160, and the output 122 are disposed in a housing 162 and are rotatably supported by a plurality of bearings (not shown).

The first input gear 126 is a spur gear drivingly engaged with an end portion of the input 124; however, it is understood that the first input gear 126 may be any other type of gear. The first input gear 126 may be separately formed and splined to the input 124 or the first input gear 126 may be unitary with the input 124. The first input gear 126 is meshed with the high range gear 156.

The second input gear 136 is a spur gear drivingly engaged with an end portion of the input shaft 137; however, it is understood that the second input gear 136 may be any other type of gear. The second input gear 136 may be separately formed and splined to the input shaft 137 or the second input gear 136 may be unitary with the input shaft 137. The second input gear 136 is meshed with the low range gear 158.

The high range gear 156 is a spur gear disposed about the output 122; however, it is understood that the high range gear 156 may be any other type of gear. The high range gear 156 comprises a set of range gear teeth located on the radially outward-most point of the high range gear 156. The set of range gear teeth are meshed with a set of gear teeth formed on the first input gear 126. The high range gear 156 also includes a set of clutch teeth located adjacent the shift collar 160. The set of clutch teeth of the high range gear 156 may be drivingly engaged with the shift collar 160.

The low range gear 158 is a spur gear disposed about the output 122; however, it is understood that the low range gear 158 may be any other type of gear. The low range gear 158 comprises a set of range gear teeth located on the radially outward-most point of the low range gear 158. The set of range gear teeth are meshed with a set of gear teeth formed on the second input gear 136. The low range gear 158 also includes a set of clutch teeth located adjacent the shift collar 160. The set of clutch teeth of the low range gear 158 may be drivingly engaged with the shift collar 160.

The shift collar 160 is concentrically disposed about and drivingly engaged with the output 122. The shift collar 160 includes a set of inner collar teeth 164 formed on an inner surface thereof, a first synchronizer 166, and a second synchronizer 168. The set of inner collar teeth 164 are engaged with a set of output gear teeth 170 of the output 122. The shift collar 160 can be slidably moved along the axis of the output 122 as directed manually by an operator of the vehicle or automatically by a controller 172 while maintaining engagement of the inner collar teeth 164 and the set of output gear teeth 170. A shift fork (not shown) disposed in an annular recess formed in the shift collar 160 moves the shift collar 160 along the axis of the output 122 into a first position, a second position, or a neutral position. A shift mechanism (not shown), which is drivingly engaged with shift collar 160 through the shift fork, is actuated to position the shift collar 160 as directed manually by an operator of the vehicle or automatically by the controller 172. Consequently, the shift mechanism positions the shift collar 160 into the first position, the second position, or the neutral position. In the first position, the shift collar 160 is drivingly engaged with the set of clutch teeth of the high range gear 156 and the set of output gear teeth 170 of the output 122. In the second position, the shift collar 160 is drivingly engaged with the set of clutch teeth of the low range gear 158 and the set of output gear teeth 170 of the output 122. In the neutral position, the inner collar teeth 164 of the shift collar 160 are only drivingly engaged with the set of output gear teeth 170 of the output 122. It is understood the shift collar 160, the inner collar teeth 164, the sets of clutch teeth of the range gears 156, 158, and the synchronizers 166, 168, may be substituted with any clutching device that permits selective engagement of a driving and a driven part.

The first synchronizer 166 forms a portion of the shift collar 160 adjacent the set of clutch teeth of the high range gear 156. The first synchronizer 166 is a conventional synchromesh clutch including conical engagement surfaces and chamfered engagement teeth; however, it is understood that the first synchronizer 166 may be another type of synchronizer. As the shift collar 160 is moved from the one of the second position and the neutral position into the first position, a portion of the first synchronizer 166 contacts a portion of the high range gear 156. As the shift collar 160 continues to move towards the clutch teeth of the high range gear 156, a difference in rotational speed is reduced between the output 122 and the high range gear 156, and the shift collar 160 becomes drivingly engaged with the set of clutch teeth of the high range gear 156.

The second synchronizer ring 168 forms a portion of the shift collar 160 adjacent the set of clutch teeth of the low range gear 158. The second synchronizer 168 is a conventional synchromesh clutch including conical engagement surfaces and chamfered engagement teeth; however, it is understood that the second synchronizer 168 may be another type of synchronizer. As the shift collar 160 is moved from the one of the first position and the neutral position into the second position, a portion of the second synchronizer 168 contacts a portion of the low range gear 158. As the shift collar 160 continues to move towards the clutch teeth of the low range gear 158, a difference in rotational speed is reduced between the output 122 and the low range gear 158, and the shift collar 160 becomes drivingly engaged with the set of clutch teeth of the low range gear 158.

The output 122 comprises at least one rigid member at least partially rotatably disposed in the housing 162 which is drivingly engaged with the shift collar 160 and at least one drivetrain component (not shown). The set of output gear teeth 170 is formed on a radially extending portion of the output 122. As shown in FIG. 1, the output 122 is configured to be in driving engagement with a pair of drivetrain components at opposing ends thereof. The output 122 may be a single elongate rigid member passing through the housing 162; however, it is understood that the output 122 may comprise a plurality of rigid members drivingly engaged with one another.

The controller 172 is in communication with the power source 112, the first hydrostatic unit 114, the second hydrostatic unit 116, the accumulator assembly 118, and the clutching device 120. Further, it is understood that the controller 172 may be in communication with at least one sensor (not shown) configured to measure a state of operation of one of the components of the driveline 110. Preferably, the controller 172 is in electrical communication with the power source 112, the first hydrostatic unit 114, the second hydrostatic unit 116, the accumulator assembly 118, and the clutching device 120. Alternately, the controller 172 may be in communication with the power source 112, the first hydrostatic unit 114, the second hydrostatic unit 116, the accumulator assembly 118, and the clutching device 120 using pneumatics, hydraulics, or a wireless communication medium.

The controller 172 is configured to accept an input containing information regarding at least one of an operating condition of the power source 112, the first hydrostatic unit 114, the second hydrostatic unit 116, the accumulator assembly 118, and the clutching device 120. The controller 172 uses the input to adjust the at least one of the operating condition of the power source 112, the first hydrostatic unit 114, the second hydrostatic unit 116, the position of the control valve 142, and the position of the shift collar 160. The controller 172 performs the adjustment to the operating condition of the power source 112, the first hydrostatic unit 114, the second hydrostatic unit 116, the position of the control valve 142, and the position of the shift collar 160 based on at least one of the operating condition of the power source 112, the first hydrostatic unit 114, the second hydrostatic unit 116, the pressure within each of the accumulators 144, 146, and the rotational speed of the output 122. The controller 172 references at least one of a series of instructions and conditions, an operator input, at least one data table, and at least one algorithm to determine the adjustment made to the operating condition of the power source 112, the first hydrostatic unit 114, the second hydrostatic unit 116, the position of the control valve 142, and the position of the shift collar 160.

Figure 2:
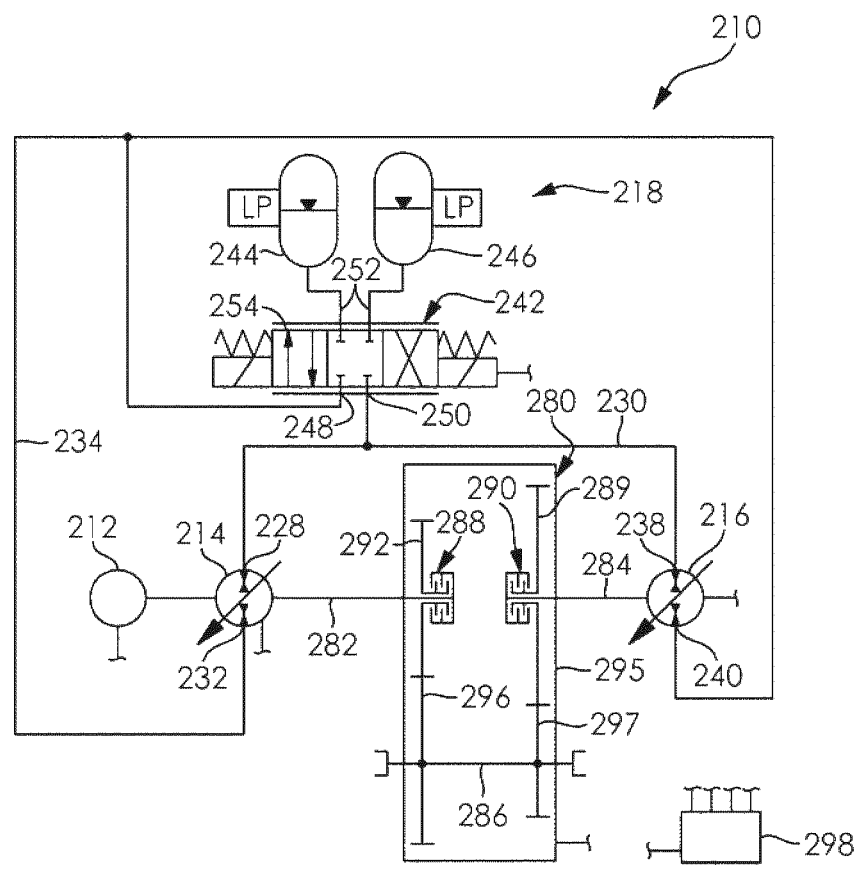
FIG. 2 is a schematic illustration of a hybrid driveline for a vehicle according to another embodiment of the invention.

FIG. 2 illustrates a driveline 210 according to another embodiment of the invention. The embodiment of the invention shown in FIG. 2 includes similar components to the driveline 110 illustrated in FIG. 1. Similar features of the embodiment shown in FIG. 2 are numbered similarly in series, with the exception of the features described below.

FIG. 2 schematically illustrates a driveline 210 for a vehicle (not shown). The driveline 210 comprises a power source 212, a first hydrostatic unit 214, a second hydrostatic unit 216, an accumulator assembly 218, and a clutching device 280. The first hydrostatic unit 214 is drivingly engaged with the power source 212 and the clutching device 280 through an input 282. The second hydrostatic unit 216 is drivingly engaged with the clutching device 280 through an input shaft 284. The accumulator assembly 218 is in fluid communication with the first hydrostatic unit 214 and the second hydrostatic unit 216. The clutching device 280 may be drivingly engaged with one of the power source 212 and the second hydrostatic unit 216 and an output 286. The driveline 210 is a hybrid driveline which may be operated in a hydrostatic mode and a direct drive mode.

The input 282 comprises at least one rigid member which is drivingly engaged with the power source 212, the first hydrostatic unit 214, and a portion of a first input clutch 288 of the clutching device 280. The input 282 may be a single elongate rigid member passing through the first hydrostatic unit 214; however, it is understood that the input 282 may comprise a plurality of rigid members drivingly engaged with one another.

The second hydrostatic unit 216 is a hydraulic axial piston motor having a movable swashplate (not shown) which varies a displacement thereof. However, it is understood the second hydrostatic unit 216 may be any other type of variable displacement motor. The second hydrostatic unit 216 is drivingly engaged with a second input gear 289 of the clutching device 280 through the input shaft 284. A first fluid port 238 of the second hydrostatic unit 216 is in fluid communication with a first fluid conduit 230. A second fluid port 240 of the second hydrostatic unit 216 is in fluid communication with a second fluid conduit 234.

The input shaft 284 comprises at least one rigid member which is drivingly engaged with the second hydrostatic unit 216, and a second input gear clutch 290 of the clutching device 280. The input shaft 284 may be a single elongate rigid member; however, it is understood that the input shaft 284 may comprise a plurality of rigid members drivingly engaged with one another.

The clutching device 280 facilitates selective driving engagement in two different manners: between the input 282 and the output 286 and between the input shaft 284 and the output 286. Further, it is understood that the clutching device 280 may be placed in a neutral position, where neither the input 282 nor the input shaft 284 is drivingly engaged with the output 286. The clutching device 280 comprises the first input clutch 288, the second input clutch 290, a first input gear 292, and the second input gear 289. The first input clutch 288, the second input clutch 290, the first input gear 292, the second input gear 289, and the output 286 are disposed in a housing 295 and are rotatably supported by a plurality of bearings (not shown).

The first input clutch 288 is a wet plate style clutch which may be actuated to drivingly engage the input 282 with the first input gear 292. Alternately, the first input clutch 288 may be any other style of clutch known in the art, such as a dry plate clutch or a cone clutch. The first input clutch 288 comprises at least a first plurality of plates, a second plurality of plates, and a first clutch actuator (not shown). The first plurality of plates is drivingly engaged with a plurality of clutch support splines (not shown) formed in the input 282. Accordingly, the first plurality of plates is drivingly engaged with the input 282. A plurality of tabs formed along an outer peripheral edge of each of the plates corresponds to the clutch support splines formed in a portion of the input 282. Each of the plates is a clutch plate as is known in the art. It is understood that any number of plates may form the first plurality of plates. The second plurality of plates is drivingly engaged with a plurality of clutch support splines (not shown) formed on the first input gear 292. Accordingly, the second plurality of plates is drivingly engaged with the first input gear 292. A plurality of tabs formed along an inner peripheral edge of each of the plates corresponds to the clutch support splines formed on the first input gear 292. The second plurality of plates is interleaved with the first plurality of plates. Each of the plates is a clutch plate as is known in the art. It is understood that any number of plates may form the second plurality of plates. The first plurality of plates interleaved with the second plurality of plates is known as a first clutch pack.

The first clutch actuator is a ring style hydraulic actuator. Such actuators are commonly known in the art. The first clutch actuator includes a piston and a chamber disposed adjacent the first clutch pack. The first clutch actuator is in fluid communication with a high pressure fluid source. Alternately, the first clutch actuator may be a mechanical actuator, a pneumatic actuator, or an electrical actuator.

The first input gear 292 is a spur gear rotatably disposed on the input 282 and drivingly engaged with the output 286; however, it is understood that the first input gear 292 may be any other type of gear. As mentioned hereinabove, the first input gear 292 includes the plurality of clutch support splines formed thereon for engaging with the second plurality of plates. The first input gear 292 also comprises a set of gear teeth located on the radially outward-most point of the first input gear 292. The set of gear teeth are meshed with a set of gear teeth formed on a first gear portion 296 of the output 286. When the first clutch actuator is engaged, the input 282 is at least variably drivingly engaged with the first input gear 292 through the first clutch pack.

The second input clutch 290 is a wet plate style clutch which may be actuated to drivingly engage the input shaft 284 with the second input gear 289. Alternately, the second input clutch 290 may be any other style of clutch known in the art, such as a dry plate clutch or a cone clutch. The second input clutch 290 comprises at least a first plurality of plates, a second plurality of plates, and a second clutch actuator (not shown). The first plurality of plates is drivingly engaged with a plurality of clutch support splines (not shown) formed in the input shaft 284. Accordingly, the first plurality of plates is drivingly engaged with the input shaft 284. A plurality of tabs formed along an outer peripheral edge of each of the plates corresponds to the clutch support splines formed in a portion of the input shaft 284. Each of the plates is a clutch plate as is known in the art. It is understood that any number of plates may form the first plurality of plates. The second plurality of plates is drivingly engaged with a plurality of clutch support splines (not shown) formed on the second input gear 289. Accordingly, the second plurality of plates is drivingly engaged with the second input gear 289. A plurality of tabs formed along an inner peripheral edge of each of the plates corresponds to the clutch support splines formed on the second input gear 289. The second plurality of plates is interleaved with the first plurality of plates. Each of the plates is a clutch plate as is known in the art. It is understood that any number of plates may form the second plurality of plates. The first plurality of plates interleaved with the second plurality of plates is known as a second clutch pack.

The second clutch actuator is a ring style hydraulic actuator. Such actuators are commonly known in the art. The second clutch actuator includes a piston and a chamber disposed adjacent the second clutch pack. The second clutch actuator is in fluid communication with a high pressure fluid source. Alternately, the second clutch actuator may be a mechanical actuator, a pneumatic actuator, or an electrical actuator.

The second input gear 289 is a spur gear rotatably disposed on the input shaft 284 and drivingly engaged with the output 286; however, it is understood that the second input gear 289 may be any other type of gear. As mentioned hereinabove, the second input gear 289 includes the plurality of clutch support splines formed thereon for engaging with the second plurality of plates. The second input gear 289 also comprises a set of gear teeth located on the radially outward-most point of the second input gear 289. The set of gear teeth are meshed with a set of gear teeth formed on a second gear portion 297 of the output 286. When the second clutch actuator is engaged, the input shaft 284 is at least variably drivingly engaged with the second input gear 289 through the second clutch pack.

The output 286 comprises at least one rigid member at least partially rotatably disposed in the housing 295 which is drivingly engaged with the first input gear 292, the second input gear 289, and at least one drivetrain component (not shown). The first gear portion 296 and the second gear portion 297 are each a radially extending portion of the output 286. The first gear portion 296 and the second gear portion 297 may be unitarily formed with the output 286 or the first gear portion 296 and the second gear portion 297 may be formed separate from the output 286 and coupled thereto in any conventional manner. As shown in FIG. 2, the output 286 is configured to be in driving engagement with a pair of drivetrain components at opposing ends thereof; however, it is understood that the output 286 may be configured for driving engagement with any number of drivetrain components. The output 286 may be a single elongate rigid member passing through the housing 295; however, it is understood that the output 286 may comprise a plurality of rigid members drivingly engaged with one another.

A controller 298 is in communication with the power source 212, the first hydrostatic unit 214, the second hydrostatic unit 216, the accumulator assembly 218, and the clutching device 280. Further, it is understood that the controller 298 may be in communication with at least one sensor (not shown) configured to measure a state of operation of one of the components of the driveline 210. Preferably, the controller 298 is in electrical communication with the power source 212, the first hydrostatic unit 214, the second hydrostatic unit 216, the accumulator assembly 218, and the clutching device 280. Alternately, the controller 298 may be in communication with the power source 212, the first hydrostatic unit 214, the second hydrostatic unit 216, the accumulator assembly 218, and the clutching device 280 using pneumatics, hydraulics, or a wireless communication medium.

The controller 298 is configured to accept an input containing information regarding at least one of an operating condition of the power source 212, the first hydrostatic unit 214, the second hydrostatic unit 216, the accumulator assembly 218, and the clutching device 280. The controller 298 uses the input to adjust the at least one of the operating condition of the power source 212, the first hydrostatic unit 214, the second hydrostatic unit 216, the position of a control valve 242, an engagement level of the first input clutch 288, and an engagement level of the second input clutch 290. The controller 298 performs the adjustment to the operating condition of the power source 212, the first hydrostatic unit 214, the second hydrostatic unit 216, the position of the control valve 242, the engagement level of the first input clutch 288, and the engagement level of the second input clutch 290 based on at least one of the operating condition of the power source 212, the first hydrostatic unit 214, the second hydrostatic unit 216, the pressure within each of the accumulators 244, and the rotational speed of the output 286. The controller 298 references at least one of a series of instructions and conditions, an operator input, at least one data table, and at least one algorithm to determine the adjustment made to the operating condition of the power source 212, the first hydrostatic unit 214, the second hydrostatic unit 216, the position of the control valve 242, the engagement level of the first input clutch 288, and the engagement level of the second input clutch 290.

Figure 3:
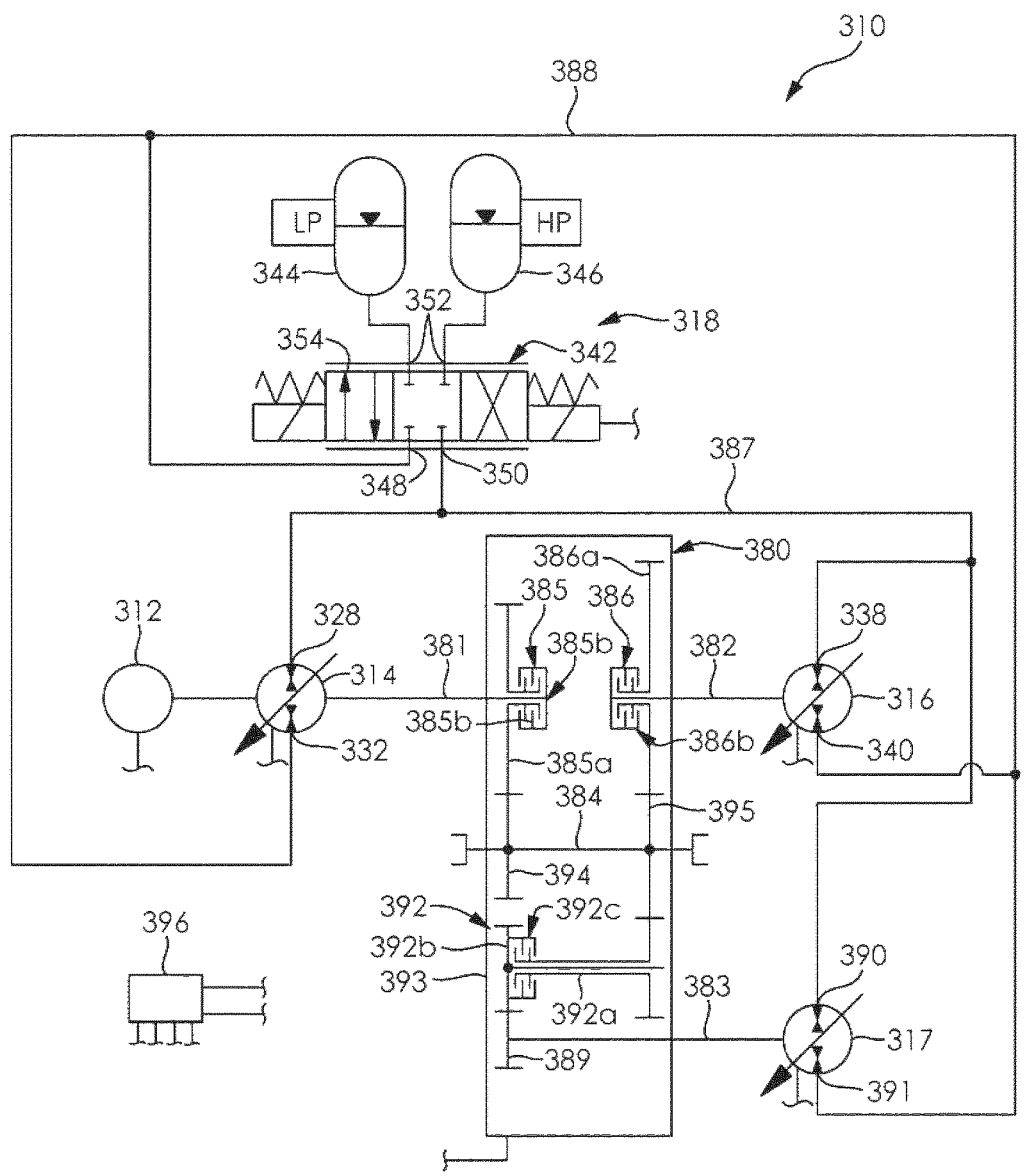
FIG. 3 is a schematic illustration of a hybrid driveline for a vehicle according to another embodiment of the invention.

FIG. 3 illustrates a driveline 310 according to another embodiment of the invention. The embodiment of the invention shown in FIG. 3 includes similar components to the driveline 110 illustrated in FIG. 1. Similar features of the embodiment shown in FIG. 3 are numbered similarly in series, with the exception of the features described below.

FIG. 3 schematically illustrates a driveline 310 for a vehicle (not shown). The driveline 310 comprises a power source 312, a first hydrostatic unit 314, a second hydrostatic unit 316, a third hydrostatic unit 317, an accumulator assembly 318, and a clutching device 380. The first hydrostatic unit 314 is drivingly engaged with the power source 312 and the clutching device 380 through an input 381. The second hydrostatic unit 316 is drivingly engaged with the clutching device 380 through an input shaft 382. The third hydrostatic unit 317 is drivingly engaged with the clutching device 380 through a second input shaft 383. The accumulator assembly 318 is in fluid communication with the first hydrostatic unit 314, the second hydrostatic unit 316, and the third hydrostatic unit 317. The clutching device 380 may be drivingly engaged with one of the power source 312, the second hydrostatic unit 316, and the third hydrostatic unit 317 and an output 384 of the clutching device 380. The driveline 310 is a hybrid driveline which may be operated in a hydrostatic mode and a direct drive mode.

The input 381 comprises at least one rigid member which is drivingly engaged with the power source 312, the first hydrostatic unit 314, and a portion of a first input clutch 385 of the clutching device 380. The input 381 may be a single elongate rigid member passing through the first hydrostatic unit 314; however, it is understood that the input 381 may comprise a plurality of rigid members drivingly engaged with one another.

The second hydrostatic unit 316 is a hydraulic axial piston motor having a movable swashplate (not shown) which varies a displacement thereof. However, it is understood the second hydrostatic unit 316 may be any other type of variable displacement motor. The second hydrostatic unit 316 is drivingly engaged with a second input clutch 386 of the clutching device 380 through the input shaft 382. A first fluid port 338 of the second hydrostatic unit 316 is in fluid communication with a first fluid conduit 387. A second fluid port 340 of the second hydrostatic unit 316 is in fluid communication with a second fluid conduit 388.

The input shaft 382 comprises at least one rigid member which is drivingly engaged with the second hydrostatic unit 316, and the second input clutch 386 of the clutching device 380. The input shaft 382 may be a single elongate rigid member; however, it is understood that the input shaft 382 may comprise a plurality of rigid members drivingly engaged with one another.

The third hydrostatic unit 317 is a hydraulic axial piston motor having a movable swashplate (not shown) which varies a displacement thereof. However, it is understood the third hydrostatic unit 317 may be any other type of variable displacement motor. The third hydrostatic unit 317 is drivingly engaged with a clutch input gear 389 of the clutching device 380 through the second input shaft 383. A first fluid port 390 of the third hydrostatic unit 317 is in fluid communication with the first fluid conduit 387. A second fluid port 391 of the third hydrostatic unit 317 is in fluid communication with the second fluid conduit 388.

The second input shaft 383 comprises at least one rigid member which is drivingly engaged with the third hydrostatic unit 317, and the clutch input gear 389 of the clutching device 380. The second input shaft 383 may be a single elongate rigid member; however, it is understood that the second input shaft 383 may comprise a plurality of rigid members drivingly engaged with one another.

The first fluid conduit 387 and the second fluid conduit 388 are conduits used in hydraulic power systems as is known in the art. The first fluid conduit 387 and the second fluid conduit 388 may comprise flexible conduits, rigid conduits, or conduits formed within other components of the driveline 310. The first fluid conduit 387 is in fluid communication with the first hydrostatic unit 314 through a first fluid port 328 thereof, the second hydrostatic unit 316 through the first fluid port 338 thereof, the third hydrostatic unit 317 through the first fluid port 390 thereof, and the accumulator assembly 318. The second fluid conduit 388 is in fluid communication with the first hydrostatic unit 314 through the second fluid port 332 thereof, the second hydrostatic unit 316 through the second fluid port 340 thereof, the third hydrostatic unit 317 through the second fluid port 391 thereof, and the accumulator assembly 318.

The clutching device 380 facilitates selective driving engagement in three different manners: between the input 381 and the output 384, between the input shaft 382 and the output 384, and between the second input shaft 383 and the output 384. Further, it is understood that the clutching device 380 may be placed in a neutral position, where each of the input 381, the input shaft 382, and the second input shaft 383 are not drivingly engaged with the output 384. The clutching device 380 comprises the first input clutch 385, the second input clutch 386, the clutch input gear 389, a clutch and jackshaft assembly 392, and the output 384. The first input clutch 385, the second input clutch 386, the clutch input gear 389, the clutch and jackshaft assembly 392, and the output 384 are disposed in a housing 393 and are rotatably supported by a plurality of bearings (not shown).

The first input clutch 385 is a wet plate style clutch which may be actuated to drivingly engage the input 381 with a first input gear 385a. Alternately, the first input clutch 385 may be any other style of clutch known in the art, such as a dry plate clutch or a cone clutch. The first input clutch 385 comprises at least a first plurality of plates, a second plurality of plates, and a first clutch actuator (not shown). The first plurality of plates is drivingly engaged with a plurality of clutch support splines (not shown) formed in the input 381. Accordingly, the first plurality of plates is drivingly engaged with the input 381. A plurality of tabs formed along an outer peripheral edge of each of the plates corresponds to the clutch support splines formed in a portion of the input 381. Each of the plates is a clutch plate as is known in the art. It is understood that any number of plates may form the first plurality of plates. The second plurality of plates is drivingly engaged with a plurality of clutch support splines (not shown) formed on the first input gear 385a. Accordingly, the second plurality of plates is drivingly engaged with the first input gear 385a. A plurality of tabs formed along an inner peripheral edge of each of the plates corresponds to the clutch support splines formed on the first input gear 385a. The second plurality of plates is interleaved with the first plurality of plates. Each of the plates is a clutch plate as is known in the art. It is understood that any number of plates may form the second plurality of plates. The first plurality of plates interleaved with the second plurality of plates is known as a first clutch pack 385b.

The first clutch actuator is a ring style hydraulic actuator. Such actuators are commonly known in the art. The first clutch actuator includes a piston and a chamber disposed adjacent the first clutch pack 385b. The first clutch actuator is in fluid communication with a high pressure fluid source. Alternately, the first clutch actuator may be a mechanical actuator, a pneumatic actuator, or an electrical actuator.

The first input gear 385a is a spur gear rotatably disposed on the input 381 and drivingly engaged with first gear portion 394 of the output 384; however, it is understood that the first input gear 385a may be any other type of gear. As mentioned hereinabove, the first input gear 385a includes the plurality of clutch support splines formed thereon for engaging with the second plurality of plates. The first input gear 385a also comprises a set of gear teeth located on the radially outward-most point of the first input gear 385a. The set of gear teeth are meshed with a set of gear teeth formed on the first gear portion 394 of the output 384. When the first clutch actuator is engaged, the input 381 is at least variably drivingly engaged with the first input gear 385a through the first clutch pack 385b.

The second input clutch 386 is a wet plate style clutch which may be actuated to drivingly engage the input shaft 382 with a second input gear 386a. Alternately, the second input clutch 386 may be any other style of clutch known in the art, such as a dry plate clutch or a cone clutch. The second input clutch 386 comprises at least a first plurality of plates, a second plurality of plates, and a second clutch actuator (not shown). The first plurality of plates is drivingly engaged with a plurality of clutch support splines (not shown) formed in the input shaft 382. Accordingly, the first plurality of plates is drivingly engaged with the input shaft 382. A plurality of tabs formed along an outer peripheral edge of each of the plates corresponds to the clutch support splines formed in a portion of the input shaft 382. Each of the plates is a clutch plate as is known in the art. It is understood that any number of plates may form the first plurality of plates. The second plurality of plates is drivingly engaged with a plurality of clutch support splines (not shown) formed on the second input gear 386a. Accordingly, the second plurality of plates is drivingly engaged with the second input gear 386a. A plurality of tabs formed along an inner peripheral edge of each of the plates corresponds to the clutch support splines formed on the second input gear 386a. The second plurality of plates is interleaved with the first plurality of plates. Each of the plates is a clutch plate as is known in the art. It is understood that any number of plates may form the second plurality of plates. The first plurality of plates interleaved with the second plurality of plates is known as a second clutch pack 386b.

The second clutch actuator is a ring style hydraulic actuator. Such actuators are commonly known in the art. The second clutch actuator includes a piston and a chamber disposed adjacent the second clutch pack 386b. The second clutch actuator is in fluid communication with a high pressure fluid source. Alternately, the second clutch actuator may be a mechanical actuator, a pneumatic actuator, or an electrical actuator.

The second input gear 386a is a spur gear rotatably disposed on the input shaft 382 and drivingly engaged with a second gear portion 395 of the output 384; however, it is understood that the second input gear 386a may be any other type of gear. As mentioned hereinabove, the second input gear 386a includes the plurality of clutch support splines formed thereon for engaging with the second plurality of plates. The second input gear 386a also comprises a set of gear teeth located on the radially outward-most point of the second input gear 386a. The set of gear teeth are meshed with a set of gear teeth formed on the second gear portion 395 of the output 384. When the second clutch actuator is engaged, the input shaft 382 is at least variably drivingly engaged with the second input gear 386a through the second clutch pack 386b.

The clutch input gear 389 is a spur gear drivingly engaged with an end portion of the second input shaft 383; however, it is understood that the clutch input gear 389 may be any other type of gear. The clutch input gear 389 may be separately formed and splined to the second input shaft 383 or the clutch input gear 389 may be unitary with the second input shaft 383. The clutch input gear 389 is meshed with a portion of the clutch and jackshaft assembly 392.

The clutch and jackshaft assembly 392 may be actuated to drivingly engage the second input shaft 383 with a third input gear 392a. The clutch and jackshaft assembly 392 comprises a wet plate clutch; however, it is understood that the clutch and jackshaft assembly 392 may be any other style of clutch known in the art, such as a dry plate clutch or a cone clutch. The clutch and jackshaft assembly 392 comprises the third input gear 392*a*, a geared input shaft 392*b*, a first plurality of plates, a second plurality of plates, and a third clutch actuator (not shown). The first plurality of plates is drivingly engaged with a plurality of clutch support splines (not shown) formed in the third input gear 392*a*. Accordingly, the first plurality of plates is drivingly engaged with third input gear 392*a*. A plurality of tabs formed along an inner peripheral edge of each of the plates corresponds to the clutch support splines formed in a portion of the third input gear 392*a*. Each of the plates is a clutch plate as is known in the art. It is understood that any number of plates may form the first plurality of plates. The second plurality of plates is drivingly engaged with a plurality of clutch support splines (not shown) formed in the geared input shaft 392*b*. Accordingly, the second plurality of plates is drivingly engaged with the geared input shaft 392*b*. A plurality of tabs formed along an outer peripheral edge of each of the plates corresponds to the clutch support splines formed on the geared input shaft 392*b*. The second plurality of plates is interleaved with the first plurality of plates. Each of the plates is a clutch plate as is known in the art. It is understood that any number of plates may form the second plurality of plates. The first plurality of plates interleaved with the second plurality of plates is known as a third clutch pack 392*c*.

The third clutch actuator is a ring style hydraulic actuator. Such actuators are commonly known in the art. The third clutch actuator includes a piston and a chamber disposed adjacent the third clutch pack 392*c*. The third clutch actuator is in fluid communication with a high pressure fluid source. Alternately, the third clutch actuator may be a mechanical actuator, a pneumatic actuator, or an electrical actuator.

The third input gear 392*a* is a geared member which is rotatably disposed onto the geared input shaft 392*b*. The third input gear 392*a* is drivingly engaged with the second gear portion 395 of the output 384. As mentioned hereinabove, the third input gear 392*a* includes the plurality of clutch support splines formed thereon for engaging with the first plurality of plates. The third input gear 392*a* also comprises a set of gear teeth located on a radially outward-most point of the third input gear 392*a*. The set of gear teeth are meshed with a set of gear teeth formed on the second gear portion 395 of the output 384. When the third clutch actuator is engaged, the geared input shaft 392*b* is at least variably drivingly engaged with the third input gear 392*a* through the third clutch pack 392*c*.

The geared input shaft 392*b* is a geared member onto which the third input gear 392*a* is rotatably disposed. The geared input shaft 392*b* is drivingly engaged with the clutch input gear 389. As mentioned hereinabove, the geared input shaft 392*b* includes the plurality of clutch support splines formed thereon for engaging with the second plurality of plates. The geared input shaft 392*b* also comprises a set of gear teeth located on a radially outward-most point of the geared input shaft 392*b*. The set of gear teeth are meshed with a set of gear teeth formed on the clutch input gear 389. When the third clutch actuator is engaged, the geared input shaft 392*b* is at least variably drivingly engaged with third input gear 392*a* through the third clutch pack 386*b*.

The output 384 comprises at least one rigid member at least partially rotatably disposed in the housing 393 which is drivingly engaged with at least one drivetrain component (not shown). A set of output gear teeth is formed on both the first gear portion 394 and the second gear portion 395. The first gear portion 394 and the second gear portion 395 each radially extend from the output 384. As shown in FIG. 3, the output 384 is configured to be in driving engagement with a pair of drivetrain components at opposing ends thereof. The output 384 may be a single elongate rigid member passing through the housing 393; however, it is understood that the output 384 may comprise a plurality of rigid members drivingly engaged with one another.

A controller 396 is in communication with the power source 312, the first hydrostatic unit 314, the second hydrostatic unit 316, the third hydrostatic unit 317, the accumulator assembly 318, and the clutching device 380. Further, it is understood that the controller 396 may be in communication with at least one sensor (not shown) configured to measure a state of operation of one of the components of the driveline 310. Preferably, the controller 396 is in electrical communication with the power source 312, the first hydrostatic unit 314, the second hydrostatic unit 316, the third hydrostatic unit 317, the accumulator assembly 318, and the clutching device 380. Alternately, the controller 396 may be in communication with the power source 312, the first hydrostatic unit 314, the second hydrostatic unit 316, the third hydrostatic unit 317, the accumulator assembly 318, and the clutching device 380 using pneumatics, hydraulics, or a wireless communication medium.

The controller 396 is configured to accept an input containing information regarding at least one of an operating condition of the power source 312, the first hydrostatic unit 314, the second hydrostatic unit 316, the third hydrostatic unit 317, the accumulator assembly 318, and the clutching device 380. The controller 396 uses the input to adjust the at least one of the operating condition of the power source 312, the first hydrostatic unit 314, the second hydrostatic unit 316, the third hydrostatic unit 317, the position of a control valve 342, and a state of engagement of each of the first input clutch 385, the second input clutch 386, and the clutch and jackshaft assembly 392. The controller 396 performs the adjustment to the operating condition of the power source 312, the first hydrostatic unit 314, the second hydrostatic unit 316, the third hydrostatic unit 317, the position of a control valve 342, and a state of engagement of each of the first input clutch 385, the second input clutch 386, and the clutch and jackshaft assembly 392 based on at least one of the operating condition of the power source 312, the first hydrostatic unit 314, the second hydrostatic unit 316, the third hydrostatic unit 317, the pressure within a pair accumulators 344, 346 of the accumulator assembly 318, and the rotational speed of the output 384. The controller 396 references at least one of a series of instructions and conditions, an operator input, at least one data table, and at least one algorithm to determine the adjustment made to the operating condition of the power source 312, the first hydrostatic unit 314, the second hydrostatic unit 316, the third hydrostatic unit 317, the position of a control valve 342, and a state of engagement of each of the first input clutch 385, the second input clutch 386, and the clutch and jackshaft assembly 392.

In use, the driveline 110, 210 may be operated in at least four different hybrid modes of operation. The hybrid modes of operation of the driveline 110, 210 may be described as either series operation (hydrostatic) or parallel operation (direct drive). The series operation of the driveline 110, 210 is characterized by a transfer of power from the power source 112, 212 to the output 122, 286 via the first hydrostatic unit 114, 214, the fluid conduits 130, 134, 230, 234, the second hydrostatic unit 116, 216, and the clutching device 120, 280. The parallel operation of the driveline 110, 210 is characterized by a transfer of power from the power source 112, 212 to the output 122, 286 via the input 124, 282 and the clutching device 120, 280. In either the series operation or the parallel operation of the driveline 110, 210, the accumulator assembly 118, 218 may be operated in a manner to apply a rotational force to the output 122, 286 or collect energy from the output 122, 286 via the first hydrostatic unit 114, 214 or the second hydrostatic unit 116, 216; which define the at least four different hybrid modes of operation of the driveline 110, 210.

When the driveline 110, 210 is placed in the series mode of operation, the set of clutch teeth of the low range gear 158 are drivingly engaged with the shift collar 160 or the second input clutch 290 is actuated while the first input clutch 288 is disengaged. Accordingly, the output 122, 286 is driven through the low range gear 158 or the second gear portion 297. As non-limiting examples, the low range gear 158 or the second gear portion 297 may be configured to provide the driveline 110, 210 with a relatively low drive ratio, which may facilitate operation of the driveline 110, 210 during repetitive tasks (such as starting and stopping) or operation of the driveline 110, 210 in confined areas.

When the driveline 110, 210 is placed in the series mode of operation, the accumulator assembly 118, 218 may be operated in a manner to apply a rotational force to the output 122, 286 using the second hydrostatic unit 116, 216. To apply a rotational force to the output 122, 286, the controller 172, 298 places the sliding spool 154, 254 of the control valve 142, 242 in a position that allows fluid communication between the high pressure accumulator 146, 246 and the first fluid conduit 130, 230. Based on at least one of the operating condition of the power source 112, 212, the first hydrostatic unit 114, 214, the second hydrostatic unit 116, 216, the pressure within each of the accumulators 144, 146, 244, 246, and the rotational speed of the output 122, 286, the controller 172, 298 adjusts a position of the swashplate of each of the first hydrostatic unit 114, 214 and the second hydrostatic unit 116, 216 to apply a rotational force to the output 122, 286 using pressure from the high pressure accumulator 146, 246. Energy stored in the high pressure accumulator 146, 246 is applied to the output 122, 286 through the second hydrostatic unit 116, 216 via the first fluid conduit 130, 230. As a result, fluid passes from the first fluid conduit 130, 230 into the second fluid conduit 134, 234 and into the low pressure accumulator 144, 244 (in fluid communication with the second fluid conduit 134, 234 via the control valve 142). Applying a rotational force to the output 122, 286 using the second hydrostatic unit 116, 216 using pressure from the high pressure accumulator 146, 246 may be performed, for example, when the driveline 110, 210 is accelerating.

When the driveline 110, 210 is placed in the series mode of operation, the accumulator assembly 118, 218 may be operated in a manner to collect energy from the output 122, 286 using the second hydrostatic unit 116, 216. Energy collected from the output 122, 286 using the second hydrostatic unit 116, 216 is stored in the high pressure accumulator 146, 246. To collect energy from the output 122, 286, the controller 172, 298 places the sliding spool 154, 254 of the control valve 142, 242 in a position that allows fluid communication between the high pressure accumulator 146, 246 and the second fluid conduit 134, 234. Based on at least one of the operating condition of the power source 112, 212, the first hydrostatic unit 114, 214, the second hydrostatic unit 116, 216, the pressure within each of the accumulators 144, 146, 244, 246, and the rotational speed of the output 122, 286, the controller 172, 298 adjusts a position of the swashplate of each of the first hydrostatic unit 114, 214 and the second hydrostatic unit 116, 216 to collect energy from the output 122, 286 by increasing an amount of fluid stored in the high pressure accumulator 146, 246. Energy from the output 122, 286 is used to transfer and increase a pressure of fluid from the first fluid conduit 130, 230 (in fluid communication with the low pressure accumulator 144, 244) to the second fluid conduit 134, 234 (in fluid communication with the high pressure accumulator 146, 246). Collecting energy from the output 122, 286 by increasing an amount of fluid stored in the high pressure accumulator 146, 246 may be performed, for example, when the driveline 110, 210 is decelerating or when a braking of the driveline 110, 210 is desired.

When the driveline 110, 210 is placed in the parallel mode of operation, the set of clutch teeth of the high range gear 156 are drivingly engaged with the shift collar 160 or the first input clutch 288 is actuated while the second input clutch 290 is disengaged. Accordingly, the output 122, 286 is driven through the high range gear 156 or the first gear portion 296. As a non-limiting example, the high range gear 156 or the first gear portion 296 may be configured to provide the driveline 110, 210 with a relatively high drive ratio, which may facilitate operation of the driveline 110, 210 during tasks in which the driveline 110, 210 is operated at high speeds, such as when the vehicle the driveline 110, 210 is incorporated in is undergoing acceleration to high speeds or when the vehicle the driveline 110, 210 is incorporated in is moved long distances.

When the driveline 110, 210 is placed in the parallel mode of operation, the accumulator assembly 118, 218 may be operated in a manner to apply a rotational force to the output 122, 286 using the first hydrostatic unit 114, 214. To apply a rotational force to the output 122, 286, the controller 172, 298 places the sliding spool 154, 254 of the control valve 142, 242 in a position that allows fluid communication between the high pressure accumulator 146, 246 and the first fluid conduit 130, 230. Based on at least one of the operating condition of the power source 112, 212, the first hydrostatic unit 114, 214, the pressure within each of the accumulators 144, 146, 244, 246, and the rotational speed of the output 122, 286, the controller 172, 298 adjusts a position of the swashplate of the first hydrostatic unit 114, 214 to apply a rotational force to the output 122, 286 using pressure from the high pressure accumulator 146, 246. Energy stored in the high pressure accumulator 146, 246 is applied to the output 122, 286 through the first hydrostatic unit 114, 214 via the first fluid conduit 130, 230. As a result, fluid passes from the first fluid conduit 130, 230 into the second fluid conduit 134, 234 and into the low pressure accumulator 144, 244 (in fluid communication with the second fluid conduit 134, 234 via the control valve 142). Applying a rotational force to the output 122, 286 using the first hydrostatic unit 114, 214 using pressure from the high pressure accumulator 146, 246 may be performed, for example, when the driveline 110, 210 is accelerating.

When the driveline 110, 210 is placed in the parallel mode of operation, the accumulator assembly 118, 218 may be operated in a manner to collect energy from the output 122, 286 using the first hydrostatic unit 114, 214. Energy collected from the output 122, 286 using the first hydrostatic unit 114, 214 is stored in the high pressure accumulator 146, 246. To collect energy from the output 122, 286, the controller 172, 298 places the sliding spool 154, 254 of the control valve 142, 242 in a position that allows fluid communication between the high pressure accumulator 146, 246 and the first fluid conduit 130, 230. Based on at least one of the operating condition of the power source 112, 212, the first hydrostatic unit 114, 214, the pressure within each of the accumulators 144, 146, 244, 246, and the rotational speed of the output 122, 286, the controller 172, 298 adjusts a position of the swashplate of the first hydrostatic unit 114, 214 to collect energy from the output 122, 286 by increasing an amount of fluid stored in the high pressure accumulator 146, 246. Energy from the output 122, 286 is used to transfer and increase a pressure of fluid from the second fluid conduit 134, 234 (in fluid communication with the low pressure accumulator 144, 244) to the first fluid conduit 130, 230 (in fluid communication with the high pressure accumulator 146, 246). Collecting energy from the output 122, 286 by increasing an amount of fluid stored in the high pressure accumulator 146, 246 may be performed, for example, when the driveline 110, 210 is decelerating or when a braking of the driveline 110, 210 is desired.

The driveline 110, 210 may also be operated in two non-hybrid modes of operation. The non-hybrid modes of operation of the driveline 110, 210 may be described as either a low range non-hybrid mode of operation or a high range non-hybrid mode of operation. The low range non-hybrid mode of operation of the driveline 110, 210 is characterized by a transfer of power from the power source 112, 212 to the output 122, 286 via the first hydrostatic unit 114, 214, the fluid conduits 130, 134, 230, 234, the second hydrostatic unit 116, 216, and the clutching device 120, 280. The high range non-hybrid mode of operation of the driveline 110, 210 is characterized by a transfer of power from the power source 112, 212 to the output 122, 286 via the input 124, 282 and the clutching device 120, 280. In either the low range non-hybrid mode of operation or the high range non-hybrid mode of operation of the driveline 110, 210, the sliding spool 154, 254 of the control valve 142, 242 is placed in a position that does not allow fluid communication between either the low pressure accumulator 144, 244 or the high pressure accumulator 146, 246 and one of the first fluid conduit 130, 230 and the second fluid conduit 134, 234.

When the driveline 110, 210 is placed in the low range non-hybrid mode of operation, the set of clutch teeth of the low range gear 158 are drivingly engaged with the shift collar 160 or the second input clutch 290 is actuated while the first input clutch 288 is disengaged. Accordingly, the output 122, 286 is driven by the second hydrostatic unit 116, 216 through the low range gear 158 or the second gear portion 297. The second hydrostatic unit 116, 216 is driven using fluid pressure generated by the first hydrostatic unit 114, 214 and transferred through the first fluid conduit 130, 230 and the second fluid conduit 134, 234. Based on at least one of the operating condition of the power source 112, 212, the first hydrostatic unit 114, 214, the second hydrostatic unit 116, 216, and the rotational speed of the output 122, 286, the controller 172, 298 adjusts a position of the swashplate of each of the first hydrostatic unit 114, 214 and the second hydrostatic unit 116, 216 to apply a rotational force to the output 122, 286 using the first hydrostatic unit 114, 214 and the second hydrostatic unit 116, 216.

When the driveline 110, 210 is placed in the high range non-hybrid mode of operation, the set of clutch teeth of the high range gear 156 are drivingly engaged with the shift collar 160 or the first input clutch 288 is actuated while the second input clutch 290 is disengaged. Accordingly, the output 122, 286 is driven by the input 124, 282 through the high range gear 156 or the first gear portion 296. The controller 172, 298 adjusts the operating condition of the power source 112, 212 to apply a rotational force to the output 122, 286 through the input 124, 282 and the high range gear 156 or the first gear portion 296.

In use, the driveline 310 may be operated in at least four different hybrid modes of operation. The hybrid modes of operation of the driveline 310 may be described as either series operation or parallel operation. The series operation of the driveline 310 is characterized by a transfer of power from the power source 312 to the output 384 via the first hydrostatic unit 314, the fluid conduits 387, 388, the second hydrostatic unit 316, the third hydrostatic unit 317, and the clutching device 380. The parallel operation of the driveline 310 is characterized by a transfer of power from the power source 312 to the output 384 via the input 381 and the clutching device 380. In either the series operation or the parallel operation of the driveline 310, the accumulator assembly 318 may be operated in a manner to apply a rotational force to the output 384 or collect energy from the output 384 via the first hydrostatic unit 314, the second hydrostatic unit 316, and the third hydrostatic unit 317; which define the at least four different hybrid modes of operation of the driveline 310.

When the driveline 310 is placed in the series mode of operation, at least one of the second input clutch 386 and the clutch and jackshaft assembly 392 is actuated while the first input clutch 385 is disengaged. Accordingly, the output 384 is driven through at least one of the second input gear 386*a* and the third input gear 392*a*. As non-limiting examples, the second input gear 386*a* or the third input gear 392*a* may be configured to provide the driveline 310 with a relatively low drive ratio, which may facilitate operation of the driveline 310 during repetitive tasks (such as starting and stopping) or operation of the driveline 310 in confined areas.

When the driveline 310 is placed in the series mode of operation, the accumulator assembly 318 may be operated in a manner to apply a rotational force to the output 384 using one of the second hydrostatic unit 316 and the third hydrostatic unit 317. To apply a rotational force to the output 384, the controller 396 places the sliding spool 354 of the control valve 342 in a position that allows fluid communication between the high pressure accumulator 346 and the first fluid conduit 387. Based on at least one of the operating condition of the power source 312, the first hydrostatic unit 314, the second hydrostatic unit 316, the third hydrostatic unit 317, the pressure within each of the accumulators 344, 346, and the rotational speed of the output 384, the controller 396 adjusts a position of the swashplate of each of the first hydrostatic unit 314, and the second hydrostatic unit 316 or the third hydrostatic unit 317 to apply a rotational force to the output 384 using pressure from the high pressure accumulator 346. Energy stored in the high pressure accumulator 346 is applied to the output 384 through the second hydrostatic unit 316 or the third hydrostatic unit 317 via the first fluid conduit 387. As a result, fluid passes from the first fluid conduit 387 into the second fluid conduit 388 and into the low pressure accumulator 344 (in fluid communication with the second fluid conduit 388 via the control valve 342). Applying a rotational force to the output 384 using the second hydrostatic unit 316 or the third hydrostatic unit 317 using pressure from the high pressure accumulator 346 may be performed, for example, when the driveline 310 is accelerating.

When the driveline 310 is placed in the series mode of operation, the accumulator assembly 318 may be operated in a manner to collect energy from the output 384 using the second hydrostatic unit 316 or the third hydrostatic unit 317. Energy collected from the output 384 using the second hydrostatic unit 316 or the third hydrostatic unit 317 is stored in the high pressure accumulator 346. To collect energy from the output 384, the controller 396 places the sliding spool 354 of the control valve 342 in a position that allows fluid communication between the high pressure accumulator 346 and the second fluid conduit 388. Based on at least one of the operating condition of the power source 312, the first hydrostatic unit 314, the second hydrostatic unit 316, the third hydrostatic unit 317, the pressure within each of the accumulators 344, 346, and the rotational speed of the output 384, the controller 396 adjusts a position of the swashplate of each of the first hydrostatic unit 314 and the second hydrostatic unit 316 or the third hydrostatic unit 317 to collect energy from the output 384 by increasing an amount of fluid stored in the high pressure accumulator 346. Energy from the output 384 is used to transfer and increase a pressure of fluid from the first fluid conduit 387 (in fluid communication with the low pressure accumulator 344) to the second fluid conduit 388 (in fluid communication with the high pressure accumulator 346). Collecting energy from the output 384 by increasing an amount of fluid stored in the high pressure accumulator 346 may be performed, for example, when the driveline 310 is decelerating or when a braking of the driveline 310 is desired.

When the driveline 310 is placed in the parallel mode of operation, the first input clutch 385 is actuated while the second input clutch 386 and the clutch and jackshaft assembly 392 are disengaged. Accordingly, the output 384 is driven through the first input gear 385a and the first gear portion 394. As a non-limiting example, the first input gear 385a and the first gear portion 394 may be configured to provide the driveline 310 with a relatively high drive ratio, which may facilitate operation of the driveline 310 during tasks in which the driveline 310 is operated at high speeds, such as when the vehicle the driveline 310 is incorporated in is undergoing acceleration to high speeds or when the vehicle the driveline 310 is incorporated in is moved long distances.

When the driveline 310 is placed in the parallel mode of operation, the accumulator assembly 318 may be operated in a manner to apply a rotational force to the output 384 using the first hydrostatic unit 314. To apply a rotational force to the output 384, the controller 396 places the sliding spool 354 of the control valve 342 in a position that allows fluid communication between the high pressure accumulator 346 and the first fluid conduit 387. Based on at least one of the operating condition of the power source 312, the first hydrostatic unit 314, the pressure within each of the accumulators 344, 346, and the rotational speed of the output 384, the controller 396 adjusts a position of the swashplate of the first hydrostatic unit 314 to apply a rotational force to the output 384 using pressure from the high pressure accumulator 346. Energy stored in the high pressure accumulator 346 is applied to the output 384 through the first hydrostatic unit 314 via the first fluid conduit 387. As a result, fluid passes from the first fluid conduit 387 into the second fluid conduit 388 and into the low pressure accumulator 344 (in fluid communication with the second fluid conduit 387 via the control valve 342). Applying a rotational force to the output 384 using the first hydrostatic unit 314 using pressure from the high pressure accumulator 346 may be performed, for example, when the driveline 310 is accelerating.

When the driveline 310 is placed in the parallel mode of operation, the accumulator assembly 318 may be operated in a manner to collect energy from the output 384 using the first hydrostatic unit 314. Energy collected from the output 384 using the first hydrostatic unit 314 is stored in the high pressure accumulator 346. To collect energy from the output 384, the controller 396 places the sliding spool 354 of the control valve 342 in a position that allows fluid communication between the high pressure accumulator 346 and the first fluid conduit 387. Based on at least one of the operating condition of the power source 312, the first hydrostatic unit 314, the pressure within each of the accumulators 344, 346, and the rotational speed of the output 384, the controller 396 adjusts a position of the swashplate of the first hydrostatic unit 114, 214 to collect energy from the output 384 by increasing an amount of fluid stored in the high pressure accumulator 346. Energy from the output 384 is used to transfer and increase a pressure of fluid from the second fluid conduit 388 (in fluid communication with the low pressure accumulator 344) to the first fluid conduit 387 (in fluid communication with the high pressure accumulator 346). Collecting energy from the output 384 by increasing an amount of fluid stored in the high pressure accumulator 346 may be performed, for example, when the driveline 310 is decelerating or when a braking of the driveline 310 is desired.

The driveline 310 may also be operated in two non-hybrid modes of operation. The non-hybrid modes of operation of the driveline 310 may be described as either a low range non-hybrid mode of operation or a high range non-hybrid mode of operation. The low range non-hybrid mode of operation of the driveline 310 is characterized by a transfer of power from the power source 312 to the output 384 via the first hydrostatic unit 314, the fluid conduits 387, 388, the second hydrostatic unit 316 or the third hydrostatic unit 317, and the clutching device 380. The high range non-hybrid mode of operation of the driveline 310 is characterized by a transfer of power from the power source 312 to the output 384 via the input 381 and the clutching device 380. In either the low range non-hybrid mode of operation or the high range non-hybrid mode of operation of the driveline 310, the sliding spool 354 of the control valve 342 is placed in a position that does not allow fluid communication between either the low pressure accumulator 344 or the high pressure accumulator 346 and one of the first fluid conduit 387 and the second fluid conduit 388.

When the driveline 310 is placed in the low range non-hybrid mode of operation, one of the second input clutch 386 and the clutch and jackshaft assembly 392 is actuated while the first input clutch 288 is disengaged. Accordingly, the output 384 is driven by either the second hydrostatic unit 316 through the second input gear 386a and the second gear portion 395 or the third hydrostatic unit 317 through the third input gear 392a and the second gear portion 395. The second hydrostatic unit 316 and the third hydrostatic unit 317 are each driven using fluid pressure generated by the first hydrostatic unit 314 and transferred through the first fluid conduit 387 and the second fluid conduit 388. Based on at least one of the operating condition of the power source 312, the first hydrostatic unit 314, the second hydrostatic unit 316, the third hydrostatic unit 317, and the rotational speed of the output 384, the controller 396 adjusts a position of the swashplate of each of the first hydrostatic unit 314 and the second hydrostatic unit 316 or the third hydrostatic unit 317 to apply a rotational force to the output 384 using the first hydrostatic unit 314 and the second hydrostatic unit 316 or the third hydrostatic unit 317.

When the driveline 310 is placed in the high range non-hybrid mode of operation, the first input clutch 385 is actuated while each of the second input clutch 386 and the clutch and jackshaft assembly 392 are disengaged. Accordingly, the output 384 is driven by the input 381 through the first input gear 385a and the first gear portion 394. The controller 396 adjusts the operating condition of the power source 312 to apply a rotational force to the output 384 through the input 381 and the first input gear 385a and the first gear portion 394.

The accumulator assembly 118, 218, 318 may be used to facilitate shifting the driveline 110, 210, 310 from the series mode of operation to the parallel mode of operation or from the parallel mode of operation to the series mode of operation. During the shifting of the driveline 110, 210, 310, the accumulator assembly 118, 218, 318 may be operated in a manner to collect energy from the driveline 110, 210, 310 and place the second hydrostatic unit 116, 216, 316 or the third hydrostatic unit 317 in a condition that facilitates shifting the driveline 110, 210, 310 from the series mode of operation to the parallel mode of operation or the accumulator assembly 118, 218, 318 may be operated in a manner to place the second hydrostatic unit 116, 216, 316 or the third hydrostatic unit 317 in a condition that facilitates shifting the driveline 110, 210, 310 from the parallel mode of operation to the series mode of operation.

The accumulator assembly 118, 218, 318 may be used to facilitate shifting the driveline 110, 210, 310 from the series mode of operation to the parallel mode of operation. During a shifting procedure from the series mode to the parallel mode, the accumulator assembly 118, 218, 318 may be operated in a manner to collect energy from the driveline 110, 210, 310 and place the second hydrostatic unit 116, 216, 316 or the third hydrostatic unit 317 in a condition that facilitates the shifting procedure.

FIGS. 4A through 4F illustrate the shifting procedure for the driveline 110 from the series mode to the parallel mode as a series of steps over a given time period. It is understood that the shifting procedure for the driveline 110 may be adapted for the other embodiments of the driveline 210, 310 described herein and illustrated in FIGS. 2 and 3 using similar principles of operation. The given time period for the shifting procedure is represented on each of the horizontal axes of FIGS. 4A through 4F, and is divided into six periods of time in which the steps necessary to complete the shift are performed. The vertical axes of FIGS. 4A through 4F respectively represent a velocity of the vehicle the driveline 110 is incorporated in, a rotational speed of the second hydrostatic unit 116, a rotational speed of the power source 112, a displacement of the second hydrostatic unit 116, an amount of torque applied by the power source 112, and a position of the clutching device 120.

Figure 4A:
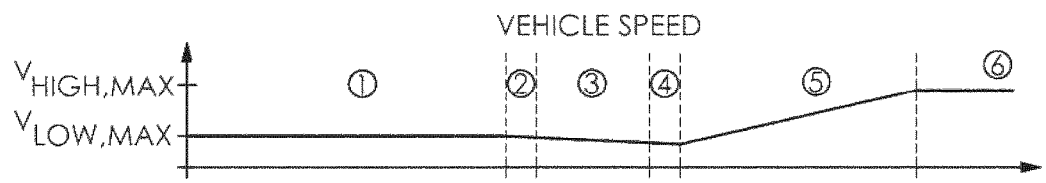
FIG. 4A graphically illustrates a speed of the vehicle the driveline illustrated in FIG. 1 is incorporated in during a shifting procedure from a series mode of operation to a parallel mode of operation.
Figure 4B:
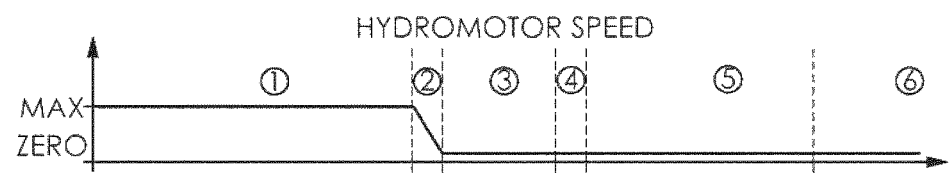
FIG. 4B graphically illustrates a rotational speed of a hydrostatic unit of the driveline illustrated in FIG. 1 during a shifting procedure from a series mode of operation to a parallel mode of operation.

The shifting procedure for the driveline 110 from the series mode to the parallel mode may be initiated when the driveline 110 is being operated at or near a maximum velocity of the series mode of the vehicle when the clutching device 120 is in the second position. As described hereinabove, in the second position the shift collar 160 is drivingly engaged with the set of clutch teeth of the low range gear 158 and the set of output gear teeth 170 of the output 122. As shown in FIG. 4A, the driveline 110 is being operated at or near a maximum velocity of the series mode when the clutching device 120 is in the second position of the vehicle during the time period labeled "1".

Figure 4C:
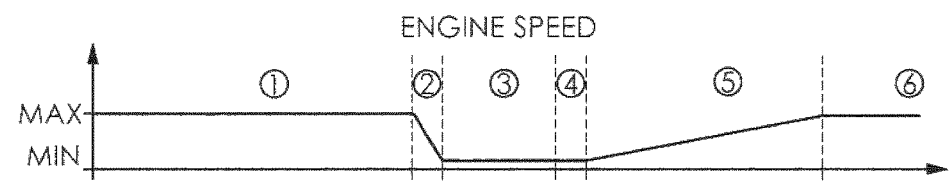
FIG. 4C graphically illustrates a rotational speed of a power source of the driveline illustrated in FIG. 1 during a shifting procedure from a series mode of operation to a parallel mode of operation.
Figure 4D:
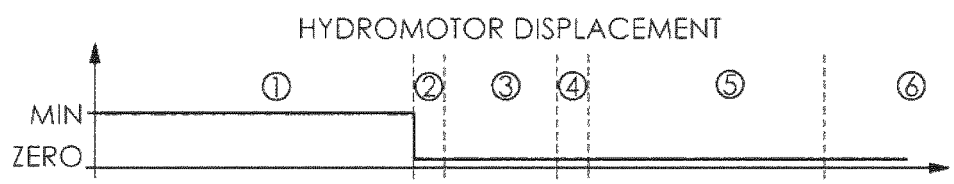
FIG. 4D graphically illustrates a displacement of a hydrostatic unit of the driveline illustrated in FIG. 1 during a shifting procedure from a series mode of operation to a parallel mode of operation.

Next, to facilitate disengagement of the shift collar 160 from the set of clutch teeth of the low range gear 158, an amount of torque applied by the second hydrostatic unit 116 to the low range gear 158 is reduced to a low or about zero value. The amount of torque applied by the second hydrostatic unit 116 to the low range gear 158 is reduced by adjusting a displacement of the second hydrostatic unit 116. In response to a command by the controller 172, the swashplate of the second hydrostatic unit 116 is positioned to adjust a displacement of the second hydrostatic unit 166 so that an amount of torque applied by the second hydrostatic unit 116 is reduced to a low or about zero value. As shown in FIG. 4D, the displacement of the second hydrostatic unit 116 is reduced to a low or about zero value during the time period labeled "2," thereby reducing an amount of torque applied by the second hydrostatic unit 116 to a low or substantially equal to zero amount. Once the amount of torque applied by the second hydrostatic unit 116 is reduced to a low or about zero value, the controller 172 disengages the shift collar 160 from the low range gear 158, placing the clutching device 120 in the neutral position.

Also during the time period labeled "2", fluid pumped by the first hydrostatic unit 114 is diverted to the high pressure accumulator 146 of the accumulator assembly 118 to accommodate for the reduced amount of displacement of the second hydrostatic unit 116. Accordingly, a pressure within the high pressure accumulator 146 is increased.

Next, in response to the clutching device 120 being placed in the neutral position, a velocity of the vehicle the driveline 110 is incorporated in may begin to decrease, as the output 122 is drivingly disengaged from both the low range gear 158 and the high range gear 156. As shown in FIG. 4A, the vehicle the driveline 110 is incorporated in may begin to decrease in velocity during the time period labeled "3".

Figure 4E:
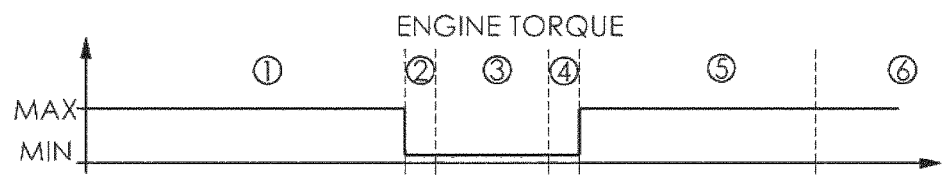
FIG. 4E graphically illustrates a torque of a power source of the driveline illustrated in FIG. 1 during a shifting procedure from a series mode of operation to a parallel mode of operation.
Figure 4F:
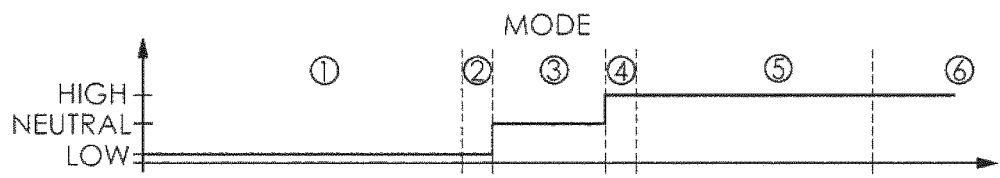
FIG. 4F graphically illustrates a mode of a clutching device of the driveline illustrated in FIG. 1 during a shifting procedure from a series mode of operation to a parallel mode of operation.

Next, to facilitate synchronization between the output 122 and the high range gear 156, and consequently engagement of the shift collar 160 with the set of clutch teeth of the high range gear 156, an amount of torque applied by the power source 112 through the first hydrostatic unit 114 to the high range gear 156 may be adjusted to a low or about zero value. The amount of torque applied by the power source 112 to the high range gear 156 may be adjusted by changing a rotational speed of the power source 112. In response to a command by the controller 172, a rotational speed of the power source 112 may be adjusted so that an amount of torque applied by the power source 112 is reduced to a low or about zero value. As non-limiting examples, a rotational speed of the power source 112 may be adjusted by adjusting a rate of fuel delivery to the power source 112 or by adjusting a level of engagement of a clutching device (not shown) forming a portion of the power source 112. As shown in FIG. 4E, the amount of torque applied by the power source 112 is reduced to a low or about zero value during the time periods labeled "2", "3", and "4". A rotational speed of the power source 112 is adjusted during the time periods labeled "2", "3", and "4" to be synchronized with a rotational speed of the output 122, as shown in FIG. 4C. Once synchronization between the output 122 and the high range gear 156 has occurred, the controller 172 engages the shift collar 160 with the high range gear 156, placing the clutching device 120 in the first position, as shown in FIG. 4F, during the time period labeled "4".

Once the clutching device 120 is placed in the first position, the shifting procedure for the driveline 110 from the series mode to the parallel mode is completed. Following completion of the shifting procedure, torque may be applied by the power source 112 to the output 122 through the high range gear 156 and the shift collar 160. As non-limiting examples, torque may be applied by the power source 112 to the output 122 by adjusting a rate of fuel delivery to the power source 112 or by adjusting a level of engagement of a clutching device (not shown) forming a portion of the power source 112. As a result of torque being applied by the power source 112 to the output 122, a rotational speed of the power source 112 is increased and a velocity of the vehicle the driveline 110 is incorporated in is increased, as shown in FIGS. 4A and 4C, during the time period labeled "5". Acceleration of the vehicle the driveline 110 is incorporated in may continue when the clutching device 120 is in the first position until the vehicle is operating at or near a maximum velocity of the vehicle, as shown in FIG. 4A, during the time period labeled "6".

The accumulator assembly 118, 218, 318 may be used to facilitate shifting the driveline 110, 210, 310 from the parallel mode of operation to the series mode of operation. During a shifting procedure from the parallel mode to the series mode, the accumulator assembly 118, 218, 318 may be operated in a manner to place the second hydrostatic unit 116, 216, 316 or the third hydrostatic unit 317 in a condition that facilitates the shifting procedure.

FIGS. 5A through 5F illustrate the shifting procedure for the driveline 110 from the parallel mode to the series mode as a series of steps over a given time period. It is understood that the shifting procedure for the driveline 110 may be adapted for the other embodiments of the driveline 210, 310 described herein and illustrated in FIGS. 2 and 3 using similar principles of operation. The given time period for the shifting procedure is represented on each of the horizontal axes of FIGS. 5A through 5F, and is divided into six periods of time in which the steps necessary to complete the shift are performed. The vertical axes of FIGS. 5A through 5F respectively represent a velocity of the vehicle the driveline 110 is incorporated in, a rotational speed of the second hydrostatic unit 116, a rotational speed of the power source 112, a displacement of the second hydrostatic unit 116, an amount of torque applied by the power source 112, and a position of the clutching device 120.

Figure 5A:
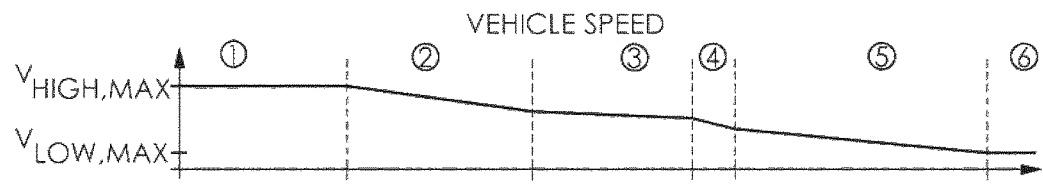
FIG. 5A graphically illustrates a speed of the vehicle the driveline illustrated in FIG. 1 is incorporated in during a shifting procedure from a parallel mode of operation to a series mode of operation.
Figure 5B:
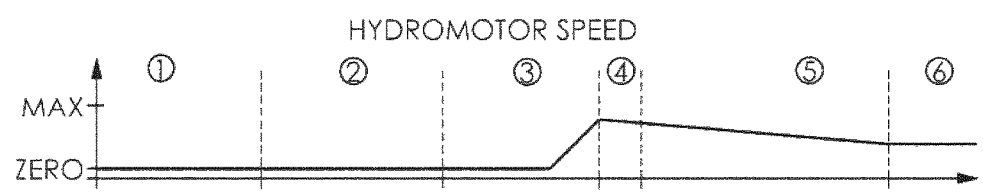
FIG. 5B graphically illustrates a rotational speed of a hydrostatic unit of the driveline illustrated in FIG. 1 during a shifting procedure from a parallel mode of operation to a series mode of operation.

The shifting procedure for the driveline 110 from the parallel mode to the series mode occurs may be initiated when the driveline 110 is being operated at or near a minimum velocity of the vehicle when the clutching device 120 is in the first position. As described hereinabove, in the first position the shift collar 160 is drivingly engaged with the set of clutch teeth of the high range gear 156 and the set of output gear teeth 170 of the output 122. As shown in FIG. 5A, the driveline 110 is being operated at or near a minimum velocity of the vehicle when the clutching device 120 is in the first position during the time period labeled "2".

Figure 5C:
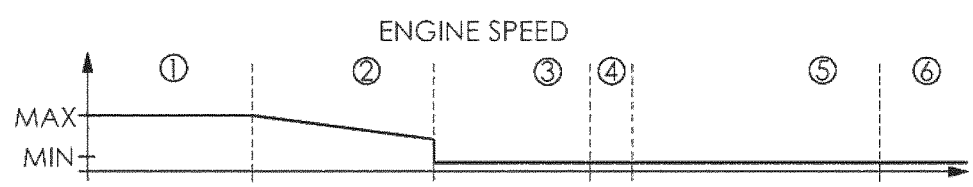
FIG. 5C graphically illustrates a rotational speed of a power source of the driveline illustrated in FIG. 1 during a shifting procedure from a parallel mode of operation to a series mode of operation.
Figure 5D:
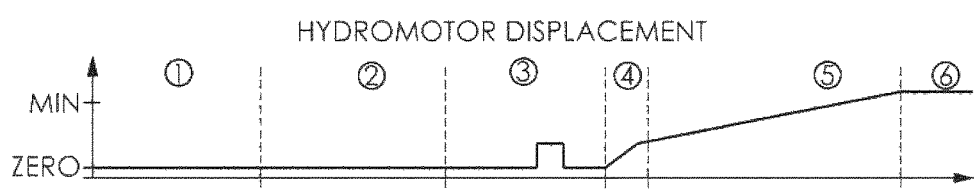
FIG. 5D graphically illustrates a displacement of a hydrostatic unit of the driveline illustrated in FIG. 1 during a shifting procedure from a parallel mode of operation to a series mode of operation.
Figure 5E:
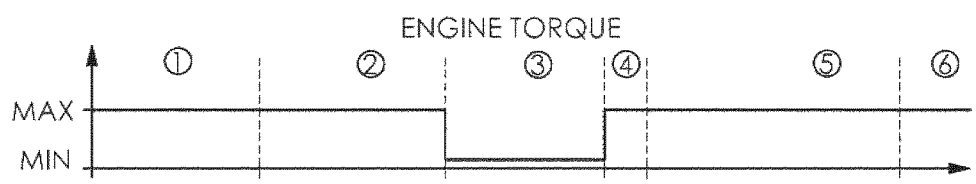
FIG. 5E graphically illustrates a torque of a power source of the driveline illustrated in FIG. 1 during a shifting procedure from a parallel mode of operation to a series mode of operation.

Next, to facilitate disengagement of the shift collar 160 from the set of clutch teeth of the high range gear 156, an amount of torque applied by the power source 112 to the high range gear 156 is reduced to a low or about zero value. The amount of torque applied by the power source 112 to the high range gear 156 may be adjusted by changing a rotational speed of the power source 112. In response to a command by the controller 172, a rotational speed of the power source 112 may be adjusted so that an amount of torque applied by the power source 112 is reduced to a low or about zero value. As non-limiting examples, a rotational speed of the power source 112 may be adjusted by adjusting a rate of fuel delivery to the power source 112 or by adjusting a level of engagement of a clutching device (not shown) forming a portion of the power source 112. As shown in FIG. 5E, the amount of torque applied by the power source 112 is reduced to a low or about zero value during the time period labeled "3". Once the amount of torque applied by the power source 112 is reduced to a low or about zero value, the controller 172 disengages the shift collar 160 from the high range gear 156, placing the clutching device 120 in the neutral position.

Next, in response to the clutching device 120 being placed in the neutral position, a velocity of the vehicle the driveline 110 is incorporated in may begin to decrease, as the output 122 is drivingly disengaged from both the low range gear 158 and the high range gear 156. As shown in FIG. 5A, the vehicle the driveline 110 is incorporated in may begin to decrease in velocity during the time period labeled "3".

Also during the time period labeled "3", fluid from the high pressure accumulator 146 of the accumulator assembly 118 is diverted to the second hydrostatic unit 116, increasing a rotational speed thereof. Further, a displacement of the second hydrostatic unit 116 is adjusted to facilitate an adjustment of the rotational speed thereof. In response to a command by the controller 172, the swashplate of the second hydrostatic unit 116 is positioned to adjust a displacement of the second hydrostatic unit 116 (and thus the low range gear 158) so that a rotational speed is increased to value that facilitates synchronization and engagement between the low range gear 158 and the output 122.

Figure 5F:
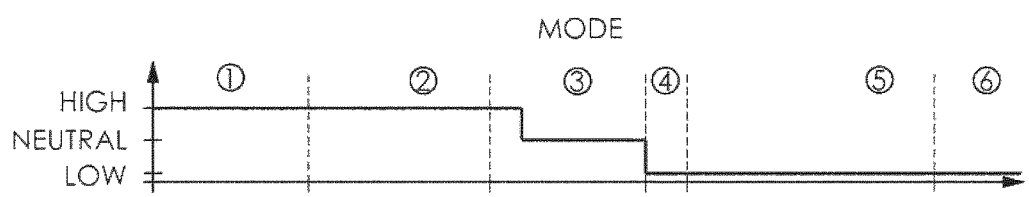
FIG. 5F graphically illustrates a mode of a clutching device of the driveline illustrated in FIG. 1 during a shifting procedure from a parallel mode of operation to a series mode of operation.

Once synchronization between the output 122 and the low range gear 158 has occurred, the controller 172 engages the shift collar 160 with the low range gear 158, placing the clutching device 120 in the second position, as shown in FIG. 5F, during the time period labeled "4".

Once the clutching device 120 is placed in the second position, the shifting procedure for the driveline 110 from the parallel mode to the series mode is completed. Following completion of the shifting procedure, torque may be applied by the power source 112 to the output 122 through the first hydrostatic unit 114, the first fluid conduit 130, the second hydrostatic unit 116, the low range gear 158, and the shift collar 160. As a result of torque being applied by the power source 112 to the output 122, a rotational speed of the power source 112 remains substantially constant and a velocity of the vehicle the driveline 110 is incorporated in may be further decreased, as shown in FIGS. 5A and 5C, during the time period labeled "5". Deceleration of the vehicle the driveline 110 is incorporated in may continue when the clutching device 120 is in the second position until the vehicle is operating at or near a minimum velocity of the vehicle, as shown in FIG. 5A, during the time period labeled "6".

In accordance with the provisions of the patent statutes, the present invention has been described in what is considered to represent its preferred embodiments. However, it should be noted that the invention can be practiced otherwise than as specifically illustrated and described without departing from its spirit or scope.

The present subject-matter includes, inter alia, the following aspects:

1. A hybrid driveline for a vehicle which may be operated in a hydrostatic drive mode and a direct drive mode, the hybrid driveline comprising:

a power source;

a first hydrostatic unit drivingly engaged with the power source;

a second hydrostatic unit selectively drivingly engaged with a vehicle output, the second hydrostatic unit in fluid communication with the first hydrostatic unit;

an accumulator assembly in fluid communication with the first hydrostatic unit and the second hydrostatic unit; and a clutching device selectively drivingly engaged with the vehicle output and one of the first hydrostatic unit and the second hydrostatic unit, wherein the hybrid driveline is operated in the hydrostatic drive mode by drivingly engaging the second hydrostatic unit with the vehicle output using the clutching device and the hybrid driveline is operated in the direct drive mode by drivingly engaging the power source with the vehicle output using the clutching device.

2. The hybrid driveline according to aspect 1,
wherein the accumulator assembly comprises a low pressure accumulator, a high pressure accumulator, and at least one control valve.

3. The hybrid driveline according to aspect 2, wherein the at least one control valve has at least a first position and a second position, the at least one control valve in the first position facilitating fluid communication between the high pressure accumulator and a first fluid conduit in fluid communication with the first hydrostatic unit and the at least one control valve in the second position facilitating fluid communication between the high pressure accumulator and a second fluid conduit in fluid communication with the first hydrostatic unit and the second hydrostatic unit.

4. The hybrid driveline according to aspect 1, wherein the clutching device comprises a shift collar, a first synchronizer, and a second synchronizer.

5. The hybrid driveline according to aspect 1, wherein the clutching device comprises a shift collar, a first synchronizer, and a second synchronizer; the first synchronizer facilitating synchronization engagement between the first hydrostatic unit and the vehicle output and the second synchronizer facilitating synchronization between the second hydrostatic unit and the vehicle output.

6. The hybrid driveline according to aspect 1, wherein the clutching device comprises a first clutch and a second clutch; the first clutch facilitating variable driving engagement between the first hydrostatic unit and the vehicle output and the second clutch facilitating variable driving engagement between the second hydrostatic unit and the vehicle output.

7. The hybrid driveline according to aspect 6, wherein the first clutch and the second clutch are each wet plate style clutches.

8. The hybrid driveline according to aspect 1, wherein the clutching device comprises a low range gear and a high range gear, the low range gear in driving engagement with the second hydrostatic unit and the vehicle output when the hybrid driveline is operated in the hydrostatic drive mode and the high range gear in driving engagement with the first hydrostatic unit and the vehicle output when the hybrid driveline is operated in the direct drive mode.

9. The hybrid driveline according to aspect 1, further comprising a third hydrostatic unit which may be selectively drivingly engaged with a vehicle output, the third hydrostatic unit in fluid communication with the first hydrostatic unit and the accumulator assembly.

10. The hybrid driveline according to aspect 9, wherein the clutching device comprises a first clutch, a second clutch, and a third clutch; the first clutch facilitating variable driving engagement between the first hydrostatic unit and the vehicle output, the second clutch facilitating variable driving engagement between the second hydrostatic unit and the vehicle output, and the third clutch facilitating variable driving engagement between the third hydrostatic unit and the vehicle output.

11. The hybrid driveline according to aspect 10, wherein the first clutch, the second clutch, and the third clutch are each wet plate style clutches.

12. A method of operating a hybrid driveline for a vehicle in a hydrostatic drive mode and a direct drive mode, the method comprising the steps of:
providing a power source;
providing a first hydrostatic unit drivingly engaged with the power source;
providing a second hydrostatic unit selectively drivingly engaged with a vehicle output, the second hydrostatic unit in fluid communication with the first hydrostatic unit;
providing an accumulator assembly in fluid communication with the first hydrostatic unit and the second hydrostatic unit;
providing a clutching device selectively drivingly engaged with the vehicle output and one of the first hydrostatic unit and the second hydrostatic unit;
drivingly engaging the second hydrostatic unit with the vehicle output using the clutching device to place the hybrid driveline in the hydrostatic drive mode; and
drivingly engaging the power source with the vehicle output using the clutching device to place the hybrid driveline in the direct drive mode.

13. The method of operating a hybrid driveline for a vehicle in a hydrostatic drive mode and a direct drive mode according to aspect 12, wherein the accumulator assembly comprises a low pressure accumulator, a high pressure accumulator, and at least one control valve.

14. The method of operating a hybrid driveline for a vehicle in a hydrostatic drive mode and a direct drive mode according to aspect 13, further comprising the step of placing the at least one control valve in one of a first position and a second position, the at least one control valve in the first position facilitating fluid communication between the high pressure accumulator and a first fluid conduit in fluid communication with the first hydrostatic unit and the at least one control valve in the second position facilitating fluid communication between the high pressure accumulator and a second fluid conduit in fluid communication with the first hydrostatic unit and the second hydrostatic unit.

15. The method of operating a hybrid driveline for a vehicle in a hydrostatic drive mode and a direct drive mode according to aspect 14, further comprising the step of applying a rotational force to the vehicle output using one of the first hydrostatic unit and the second hydrostatic unit in fluid communication with the high pressure accumulator and/or
further comprising the step of collecting energy from the vehicle output using one of the first hydrostatic unit and the second hydrostatic unit in fluid communication with the high pressure accumulator and storing the energy in the high pressure accumulator and/or
further comprising the step of collecting energy from the power source using the first hydrostatic unit in fluid communication with the high pressure accumulator and storing the energy in the high pressure accumulator to facilitate shifting from the hydrostatic drive mode to the direct drive mode and/or
further comprising the step of applying a rotational force to the second hydrostatic unit using with the high pressure accumulator to facilitate shifting from the direct drive mode to the hydrostatic drive mode.

The invention claimed is:
1. A hybrid driveline for a vehicle which may be operated in a hydrostatic drive mode and a direct drive mode, the hybrid driveline comprising:
a power source;
a first hydrostatic unit drivingly engaged with the power source;
a second hydrostatic unit selectively drivingly engaged with a vehicle output, the second hydrostatic unit in fluid communication with the first hydrostatic unit;

a first fluid conduit fluidly connecting a first fluid port of the first hydrostatic unit to a first fluid port of the second hydrostatic unit;
a second fluid conduit fluidly connecting a second fluid port of the first hydrostatic unit to a second fluid port of the second hydrostatic unit;
an accumulator assembly in fluid communication with the first hydrostatic unit and the second hydrostatic unit, wherein the accumulator assembly comprises a low pressure accumulator, a high pressure accumulator, and at least one control valve, wherein the at least one control valve has at least a first position and a second position, the at least one control valve in the first position facilitating fluid communication between the high pressure accumulator and the first fluid conduit and between the low pressure accumulator and the second fluid conduit, and the at least one control valve in the second position facilitating fluid communication between the high pressure accumulator and the second fluid conduit and between the low pressure accumulator and the first fluid conduit; and
a clutching device selectively drivingly engaged with the vehicle output and one of the first hydrostatic unit and the second hydrostatic unit;
a first fluid conduit fluidly connecting a first fluid port of the first hydrostatic unit to a first fluid port of the second hydrostatic unit;
a second fluid conduit fluidly connecting a second fluid port of the first hydrostatic unit to a second fluid port of the second hydrostatic unit;
a low range gear; and
a high range gear;
wherein the hybrid driveline is operated in the hydrostatic drive mode by drivingly engaging the second hydrostatic unit with the vehicle output through the low range gear using the clutching device and by transferring power from the power source to the vehicle output via the first hydrostatic unit, the fluid conduits, the second hydrostatic unit and the clutching device; and
wherein the hybrid driveline is operated in the direct drive mode by drivingly engaging the power source with the vehicle output through the high range gear using the clutching device.

2. The hybrid driveline according to claim 1, wherein the accumulator assembly comprises a low pressure accumulator, a high pressure accumulator, and at least one control valve.

3. The hybrid driveline according to claim 1, wherein the clutching device comprises a shift collar, a first synchronizer, and a second synchronizer.

4. The hybrid driveline according to claim 1, wherein the clutching device comprises a shift collar, a first synchronizer, and a second synchronizer; the first synchronizer facilitating synchronization engagement between the first hydrostatic unit and the vehicle output and the second synchronizer facilitating synchronization between the second hydrostatic unit and the vehicle output.

5. The hybrid driveline according to claim 1, wherein the clutching device comprises a first clutch and a second clutch; the first clutch facilitating variable driving engagement between the first hydrostatic unit and the vehicle output and the second clutch facilitating variable driving engagement between the second hydrostatic unit and the vehicle output.

6. The hybrid driveline according to claim 5, wherein the first clutch and the second clutch are each wet plate style clutches.

7. The hybrid driveline according to claim 1, further comprising a third hydrostatic unit which may be selectively drivingly engaged with the vehicle output, the third hydrostatic unit in fluid communication with the first hydrostatic unit and the accumulator assembly.

8. The hybrid driveline according to claim 7, wherein the clutching device comprises a first clutch, a second clutch, and a third clutch; the first clutch facilitating variable driving engagement between the first hydrostatic unit and the vehicle output, the second clutch facilitating variable driving engagement between the second hydrostatic unit and the vehicle output, and the third clutch facilitating variable driving engagement between the third hydrostatic unit and the vehicle output.

9. The hybrid driveline according to claim 8, wherein the first clutch, the second clutch, and the third clutch are each wet plate style clutches.

10. A method of operating a hybrid driveline for a vehicle in a hydrostatic drive mode and a direct drive mode, the method comprising the steps of:
providing a power source;
providing a first hydrostatic unit drivingly engaged with the power source;
providing a second hydrostatic unit selectively drivingly engaged with a vehicle output, the second hydrostatic unit in fluid communication with the first hydrostatic unit;
providing a first fluid conduit fluidly connecting a first fluid port of the first hydrostatic unit to a first fluid port of the second hydrostatic unit;
providing a second fluid conduit fluidly connecting a second fluid port of the first hydrostatic unit to a second fluid port of the second hydrostatic unit;
providing an accumulator assembly in fluid communication with the first hydrostatic unit and the second hydrostatic unit, wherein the accumulator assembly comprises a low pressure accumulator, a high pressure accumulator, and at least one control valve, wherein the at least one control valve has at least a first position and a second position, the at least one control valve in the first position facilitating fluid communication between the high pressure accumulator and the first fluid conduit and between the low pressure accumulator and the second fluid conduit, and the at least one control valve in the second position facilitating fluid communication between the high pressure accumulator and the second fluid conduit and between the low pressure accumulator and the first fluid conduit;
providing a clutching device selectively drivingly engaged with the vehicle output and one of the first hydrostatic unit and the second hydrostatic unit;
providing a first fluid conduit fluidly connecting a first fluid port of the first hydrostatic unit to a first fluid port of the second hydrostatic unit;
providing a second fluid conduit fluidly connecting a second fluid port of the first hydrostatic unit to a second fluid port of the second hydrostatic unit;
providing a low range gear;
providing a high range gear;
drivingly engaging the second hydrostatic unit with the vehicle output through the low range gear using the clutching device and transferring power from the power source to the vehicle output via the first hydrostatic unit, the fluid conduits, the second hydrostatic unit and the clutching device to place the hybrid driveline in the hydrostatic drive mode; and drivingly engaging the power source with the vehicle output through the high range gear using the clutching device to place the hybrid driveline in the direct drive mode.

11. The method of operating a hybrid driveline for a vehicle in a hydrostatic drive mode and a direct drive mode according to claim 10, further comprising the step of placing the at least one control valve in one of the first position and the second position, the at least one control valve in the first position facilitating fluid communication between the high pressure accumulator and the first fluid conduit in fluid communication with the first hydrostatic unit and the at least one control valve in the second position facilitating fluid communication between the high pressure accumulator and the second fluid conduit in fluid communication with the first hydrostatic unit and the second hydrostatic unit.

12. The method of operating a hybrid driveline for a vehicle in a hydrostatic drive mode and a direct drive mode according to claim 11, further comprising at least one of:

the step of applying a rotational force to the vehicle output using one of the first hydrostatic unit and the second hydrostatic unit in fluid communication with the high pressure accumulator; and/or further comprising the step of collecting energy from the vehicle output using one of the first hydrostatic unit and the second hydrostatic unit in fluid communication with the high pressure accumulator and storing the energy in the high pressure accumulator; and/or further comprising the step of collecting energy from the power source using the first hydrostatic unit in fluid communication with the high pressure accumulator and storing the energy in the high pressure accumulator to facilitate shifting from the hydrostatic drive mode to the direct drive mode; and/or further comprising the step of applying a rotational force to the second hydrostatic unit using with the high pressure accumulator to facilitate shifting from the direct drive mode to the hydrostatic drive mode.

* * * * *